US006315506B1

(12) United States Patent
Mizoguchi

(10) Patent No.: US 6,315,506 B1
(45) Date of Patent: Nov. 13, 2001

(54) SHRINKAGE FIT TYPE TOOL HOLDER

(75) Inventor: Haruki Mizoguchi, Nara (JP)

(73) Assignee: MST Corporation, Nara (JP)

( * ) Notice: Subject to any disclaimer, the term of this patent is extended or adjusted under 35 U.S.C. 154(b) by 0 days.

(21) Appl. No.: 09/485,442

(22) PCT Filed: Jul. 28, 1998

(86) PCT No.: PCT/JP98/03357

§ 371 Date: Feb. 11, 2000

§ 102(e) Date: Feb. 11, 2000

(87) PCT Pub. No.: WO99/07504

PCT Pub. Date: Feb. 18, 1999

(30) Foreign Application Priority Data

Aug. 11, 1997 (JP) .................................................. 9-228911

(51) Int. Cl.[7] .......................... B23B 31/10; B23P 11/02; B23C 9/00
(52) U.S. Cl. ...................... 409/234; 29/447; 29/DIG. 35; 403/273; 403/30; 279/102
(58) Field of Search .............. 409/234; 29/447, 29/517, DIG. 35; 279/102, 103; 408/231, 239 A; 403/30, 273

(56) References Cited

U.S. PATENT DOCUMENTS

| 3,098,662 | * | 7/1963 | Iversen | .................................. 29/447 |
| 3,316,129 | * | 4/1967 | Token et al. | ........................... 148/607 |
| 3,579,805 | * | 5/1971 | Kast | ........................................ 29/447 |
| 4,971,491 | * | 11/1990 | Cook | ..................................... 409/234 |
| 5,311,654 | * | 5/1994 | Cook | ........................................ 29/447 |
| 5,582,494 | * | 12/1996 | Cook | ..................................... 409/234 |
| 6,035,512 | * | 3/2000 | Cook | ..................................... 409/234 |
| 6,071,219 | * | 6/2000 | Cook | ..................................... 409/234 |

OTHER PUBLICATIONS

Schultz et al., "Now also Shrink–Clamping of Steel Shanks! ", *Werkstatt und Betrieb,*, vol.129, No.9, pp. 731–813, (1996).

Schultz et al., "Shrink–Clamping of Tools", *Werkstatt und Betrieb*, vol.127, No.11, pp. 841–915, (1994).

* cited by examiner

*Primary Examiner*—William Briggs
*Assistant Examiner*—Erica E Cadugan
(74) *Attorney, Agent, or Firm*—Browdy and Neimark

(57) ABSTRACT

A shrinkage-fit tool holder having a tool holder body 11 having a portion 2 adapted to be connected to a machining center, a manipulator-engaging portion 3, a chuck portion 4 and a tool-holding member 6 for firmly holding a shank of a cemented carbide tool by shrinkage fitting, at least the tool-holding member 6 being made of specialty steel having an austenitic structure that is strengthened by precipitation hardening or work hardening.

17 Claims, 21 Drawing Sheets

SHRINKAGE FIT TYPE TOOL HOLDER

CROSS REFERENCE TO RELATED APPLICATION

The present application is the national stage under 35 U.S.C. 371 of PCT/JP98/03357, filed Jul. 28, 1998.

FIELD OF THE INVENTION

The present invention relates to a shrinkage-fit tool holder for use with a machining center, a milling machine, a lathe, a boring machine, a grinding machine, etc.

BACKGROUND OF THE INVENTION

A machining center is a numerical control (NC) machining tool with an automatic tool-changing function. The machining center can automatically perform various working such as milling, drilling or notching, boring, tapping, etc. on works set thereto with improved easiness and efficiency.

To exchange and use a plurality of cutting tools in a desired manner, each tool is mounted to a tool holder and set on a tool stand. An example of the conventional tool holders is shown in FIGS. 22 and 23. This tool holder 1 comprises a tapered portion 2 adapted to be connected to a spindle of a machining center, a manipulator-engaging portion 3 and a chuck portion 4 for firmly holding the tool. A shank of the tool inserted into an aperture of the chuck portion 4 is fixed by contracting a needle roller 43 by nuts 41.

Present as a tool holder for filly holding a tool in addition to the above nut-type tool holder is a so-called shrinkage-fit tool holder. The shrinkage-fit tool holder has recently attracted much attention, because it can firmly hold a tool with an excellent dynamic balancing suitable for high-speed working. Shown in FIGS. 24(a) and (b) is an example of the shrinkage-fit tool holders. The tool holder 1 comprises a tapered connecting portion 2, a manipulator-engaging portion 3 and a chuck portion 4 for firmly holding a tool. A shank of the tool 9 is inserted into an aperture of the chuck portion 4 and secured by shrinkage fitting. A tool-holding portion formed in a front portion of the chuck portion 4 has an inner surface on which four grooves 45 for spraying a machining fluid or air are formed.

Shown in FIGS. 25(a) and (b) is another example of the shrinkage-fit tool holders. The tool holder 1 comprises a tapered connecting portion 2, a manipulator-engaging portion 3 and a chuck portion 4 for firmly holding a tool. A shank of the tool 9 inserted into an aperture of the chuck portion 4 is secured by shrinkage fitting. Four apertures 46 communicating with an aperture of the tool holder are formed in a tool-holding portion in a front portion of the chuck portion 4 in parallel with the axis of the tool holder, to spray a machining fluid or air from a tip end of the chuck portion 4.

The conventional shrinkage-fit tool holders utilize differences in thermal expansion coefficients between the tool-holding portions and the tool shanks. The tool shanks are made of materials having low thermal expansion coefficients such as cemented carbides, cermets, ceramics, invar, etc., while the tool-holding portions are made of high-expansion materials such as nickel-chromium steel, etc. (see, for instance, Japanese Utility Model Laid-Open No. 4-54606). Interference determining connecting strength (gripping strength) is approximately $1/1000$ of a diameter of the tool shank. For example, it is approximately 0.02 mm in the case of the tool shank having a diameter of 20 to 30 mm. Meeting these conditions enables a heating temperature required for shrinkage fitting to be lowered.

In these prior art tool holders, the tool shank and the aperture of the tool-holding portion have suitably controlled sizes to achieve detachability, thereby minimizing heating for shrinkage fitting and thus preventing decrease in strength and hardness of materials due to change in their structures. Proposed in addition to the above tool holders is, for example, a shrinkage-fit tool holder comprising a member made of high-speed steel, stainless steel, etc. for firmly holding a cemented carbide tool shank by caulking, from which the tool shank is detached by heating (see, for instance, Japanese Utility Model Laid-Open No. 1-92309).

However, in the conventional shrinkage-fit tool holders, the difference in a thermal expansion coefficient between the tool-holding member and the tool shank is insufficient, thereby failing to achieve a sufficient gripping strength. Thermal expansion decreases in proportion to the reduction in a diameter of the tool shank. Thus, when the diameter of the tool shank is 12 mm or less, the thermal expansion is too small to obtain a sufficient gripping strength even with a small tolerance. Accordingly, almost all commercially available tools (mostly having shank diameters of 12 mm or less) cannot be subjected to shrinkage fitting.

Any tool shanks of JIS have tolerance, which is, for instance, h7 for solid cemented carbide end mills of JIS B4116. It is difficult to achieve a sufficient different in a thermal expansion coefficient to absorb this tolerance and thus a sufficient shrinkage fitting strength, with the conventional shrinkage-fit tool holders. To completely absorb the tolerance of the tool, the tool holder should have as small a tolerance as possible in an aperture of a holding member. This is, however, difficult particularly in the case of small-diameter tools. Though it may be considered to work an aperture of a tool-holding member in each tool holder such that it is adapted to a tool shank in-situ combination thereof, it is impossible from the viewpoint of mass productivity.

It may also be considered to elevate a shrinkage-fitting temperature to absorb such tolerance, and heating is now conducted up to about 700° C. However, decrease in strength takes place in tool holders made of conventional materials, resulting in widening of the aperture of the holding member and deterioration in structures like tempering of steel by repeated heating and cooling, and thus decrease in hardness and strength of the tool holder. Further, it is likely that an oxide layer is formed in the aperture of the holding member, resulting in decrease in gripping strength and change in an inner diameter.

With respect to the structure of the tool holder, the entire tool holder is heated and cooled when a tool is directly shrinkage-fit into the tool holder. Thus, it takes too long time for shrinkage fitting, thereby making it difficult to achieve easy handling of the tool holder.

With respect to apertures for supplying a machining fluid or air, grooves are formed in an inner surface of a tool-holding member or apertures communicating to an end surface are formed as shown in FIGS. 24 and 25. However, because an extremely large stress is applied to a holding portion of the tool holder in a state of shrinkage-fitting the tool shank, the concentration of stress occurs in an aperture shape as shown in FIGS. 24 and 25. There is also a problem that the machining fluid or air is scattered by rotation of the tool, whereby it cannot be concentrated at a tip end of the tool.

Accordingly, an object of the present invention is to provide a shrinkage-fit tool holder solving problems inherent in the conventional tool holders, which shows sufficient gripping strength and can be flexibly used with commercially available tools.

DISCLOSURE OF THE INVENTION

As a result of research in view of the above object, the inventor has found that by forming at least a tool-holding portion of a tool holder by a particular austenitic steel, large interference can be achieved in shrinkage fitting, which can be carried out at a low temperature, and that such a tool holder is flexibly applicable to commercially available tools. The present invention has been completed based on this finding.

A shrinkage-fit tool holder in accordance with an embodiment of the present invention comprises (a) a tool holder body having a portion adapted to be connected to a machining center, a manipulator-engaging portion and a chuck portion; and (b) a tool-holding member for firmly holding a shank of a cemented carbide tool by shrinkage fitting, at least the tool-holding member being made of specialty steel having an austenitic structure that is strengthened by precipitation hardening or work hardening. The tool-holding member is preferably provided with apertures for supplying a machining fluid or air, which open on rear end surfaces of guide grooves axially formed on the outer surface of the tool-holding member.

A shrinkage-fit tool holder in accordance with another embodiment of the present invention comprises a portion adapted to be connected to a machining center, a manipulator-engaging portion, a chuck portion and a tool-holding portion integrally formed in a front portion of the chuck portion for firmly holding a shank of a cemented carbide tool by shrinkage fitting, at least the tool-holding portion being made of specialty steel having an austenitic structure that is strengthened by precipitation hardening or work hardening The chuck portion is preferably provided with apertures for supplying a machining fluid or air, which open on rear end surfaces of guide grooves axially formed on the outer surface of the tool-holding portion.

BRIEF DESCRIPTION OF THE DRAWINGS

FIG. 24($b$) is a plan view showing a conventional shrinkage-fit tool holder from the tool-mounting side;

FIG. 25($b$) is a plan view showing the shrinkage-fit tool holder shown in FIG. 25($a$), from the tool-mounting side.

BEST MODES FOR CARRYING OUT THE INVENTION

Figure 1:
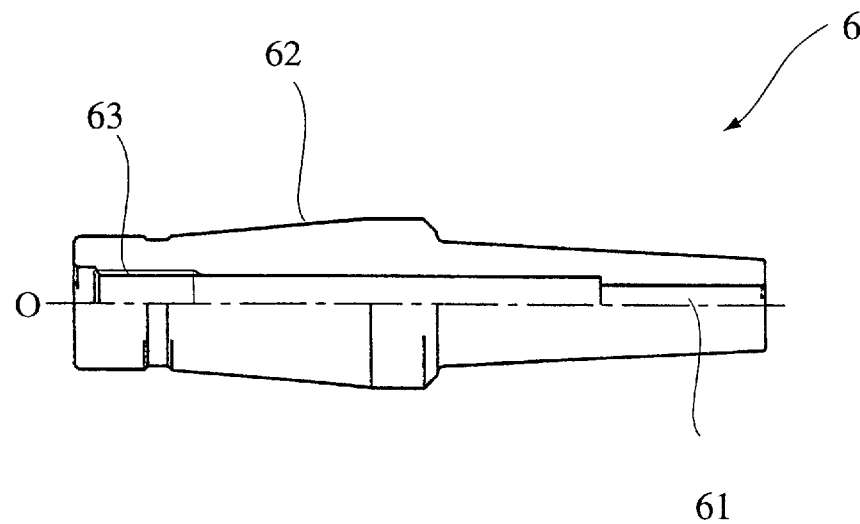
FIG. 1 is a partially cross-sectional, side view showing a tool-holding member in a shrinkage-fit tool holder in accordance with the first embodiment of the present invention.

The present invention will be described in detail below referring to the drawings attached hereto.

[1] Materials of Tool-holding Member

A thermal expansion coefficient of a tool-holding member for firmly holding a tool shank by shrinkage fitting, which depends upon a thermal expansion coefficient of the tool shank, is preferably equal to or more than the thermal expansion coefficient of the tool shank $+9.1 \times 10^{-6}/°$ C. The tool shank that is shrinkage-fit to the tool holder is made of a cemented carbide having a thermal expansion coefficient of approximately $4.4 \times 10^{-6}/°$ C. to $6.5 \times 10^{-6}/°$ C. Accordingly, the thermal expansion coefficient of the tool-holding member is preferably $13.5 \times 10^{-6}/°$ C. or more, more preferably $15.6 \times 10^{-6}/°$ C. or more. When the thermal expansion coefficient of the tool-holding member is less than $13.5 \times 10^{-6}/°$ C., sufficient shrinkage fitting of the tool cannot be achieved at such a low temperature as 500° C. or lower. The interference is preferably approximately $1/1000$ to $3/1000$ of the diameter D of the tool shank.

Because the tool-holding member is subjected to repeated heating and cooling for shrinkage fitting, it should have yield strength after heated to a shrinkage-fitting temperature (hereinafter referred to simply as "after-heating yield strength"), that is equal to or more than Mises stress. Taking into consideration tolerance, etc., a safety factor is set at 1.1 times, whereby the after-heating yield strength of the tool-holding member is preferably equal to or more than 1.1 times the Mises stress. The Mises stress is substantially determined from inner and outer diameters of the tool-holding member and interference. Table 1 shows a calculation example of the maximum Mises stress of the tool-holding member. In this calculation example, the tool-holding member has an outer diameter four times as large as an inner diameter, and the interference is set at h7 tolerance, which is the maximum in practice, $+1/1000$ of the diameter D of the tool shank.

TABLE 1

| Inner Diameter (mm) | Outer Diameter (mm) | Maximum Interference (μm) | Maximum Mises Stress σ(kgf/mm²) |
|---|---|---|---|
| 3 | 12 | 13 | 117.31 |
| 4 | 16 | 16 | 108.28 |
| 6 | 24 | 18 | 81.21 |
| 8 | 32 | 23 | 77.83 |
| 10 | 40 | 25 | 67.68 |
| 12 | 48 | 30 | 67.68 |

The Mises stress σ is calculated from the following parameters:

$r_1$: inner radius of a tool-holding member (mm),
$r_2$: outer radius of a tool-holding member (mm),
$\alpha_1$: linear thermal expansion coefficient of a tool-holding member (1/° C.),
$\alpha_1$: linear thermal expansion coefficient of a tool shank (1/° C.),
t: temperature difference (° C.),
E: Young's modulus of elasticity (kgf/mm²), and
v: Poisson's ratio.

First, expansion δ (mm) in the diametrical direction is expressed by the following equation:

$$\delta = 2r_1(\alpha_1 - \alpha_2)t \qquad (1),$$

and a holding pressure $P_1$ (kgf/mm²) is expressed by the following equation:

$$P_1 = \delta E(r_2^2 - r_1^2)/2r_1\{(1-v)r_1^2 + (1+v)r_2^2\} \qquad (2).$$

A maximum circumferential stress $\sigma_t$ kgf/mm²) and a radial stress $\sigma_r$ (kgf/mm²) are expressed by the following equations:

$$\sigma_t = \delta E r_1(r_2^2/r_1 + 1)/2\{(1-v)r_1^2 + (1+v)r_2^2\} \qquad (3),$$

and $$\sigma_r = -P_1 \qquad (4).$$

A maximum principal shear stress τ (kgf/mm²) is expressed by the following equation:

$$\tau = (1/2)(\sigma_t - \sigma_r) \qquad (5).$$

Accordingly, a principal stress (kgf/mm²) is expressed by the following equations:

$$\sigma_1 = \sigma_t,\ \sigma_2 = \sigma_r = -P_1,\ \text{and}\ \sigma_3 = v(\sigma_1 + \sigma_2) \qquad (6).$$

The Mises stress σ (kgf/mm²) is expressed by the following equation:

$$\sigma = [(1/2)\{(\sigma_2 - \sigma_3)^2 + (\sigma_3 - \sigma_1)^2 + (\sigma_1 - \sigma_2)^2\}]^{1/2} \qquad (7).$$

As steel satisfying the above conditions for a thermal expansion coefficient and after-heating yield strength, specialty steel having an austenitic structure is used. This specialty steel is strengthened by the precipitation hardening of intermetallic compounds or work hardening. In the case of the precipitation hardening, the intermetallic compounds may be carbides, sulfides, etc. Specific examples of such specialty steel having an austenitic structure are: (1) austenitic tool steel having a composition comprising 0.4 to 1 weight % of C, 1.4 weight % or less of Si, 5 to 10 weight % of Mn, 2 to 10 weight % of Ni, 7 to 14 weight % of Cr, 0.5 to 2.5 weight % of V, 0.6 to 4 weight % of Cu, and 0.6 to 4 weight % of Al, the balance being substantially Fe and inevitable impurities, for instance, HPM75 (available from Hitachi Metals, Ltd.,); (2) austenitic stainless steel having a composition comprising 0.2 weight % or less of C, 1 weight % or less of Si, 14 to 16 weight % of Mn, 0.05 weight % or less of P, 0.02 weight % or less of S, 0.2 to 1.5 weight % of Ni, 15 to 19 weight % of Cr, and 0.3 to 0.4 weight % of N, the balance being substantially Fe and inevitable impurities, for instance, AUS205 (Aichi Steel Corp.); (3) high-strength austenitic stainless steel having a composition comprising 0.15 weight % or less of C, 3 to 4.5 weight % of Si, 2 weight % or less of Mn, 0.04 weight % or less of P, 0.03 weight % or less of S, 6 to 8 weight % of Ni, 14 to 16 weight % of Cr, 0.5 to 1.5 weight % of Mo, and 0.1 weight % or less of N, the balance being substantially Fe and inevitable impurities, for instance, NTK H-1 (Nippon Kinzoku Co. Ltd.), SUH660 steel of JIS, etc. Additionally, various types of austenitic steel disclosed by Japanese Patent Laid-Open Nos. 5-302149, 8-246104, 8-277443 and 8-295998 may be used.

For example, HPM75, specialty steel having an austenitic structure, has a thermal expansion coefficient of approximately $17 \times 10^{-6}/°$ C., about 1.5 times the thermal expansion coefficient ($10.5 \times 10^{-6}/°$ C. to $11.6 \times 10^{-6}/°$ C.) of conventional nickel-chromium steel. Therefore, the tool-holding member made of such specialty steel can firmly hold the tool shank by shrinkage fitting at a relatively low temperature, with reduced time of attaching and detaching the tool.

Further, because of a larger thermal expansion at the same temperature, there can be sufficient interference between the tool-holding member and the tool shank, making it possible to sufficiently absorb the tolerance of the tool shank and the tolerance of an aperture of the tool-holding member. Furthermore, because the tool-holding member has a large after-heating yield strength, the expansion (distortion) of the aperture of the tool-holding member can effectively be prevented. However, the conventional tool-holding portion made of nickel-chromium steel should be shrinkage-fit at a relatively high temperature to obtain a large thermal expansion, resulting in inevitable decrease in strength and hardness of the tool-holding member with after-heating yield strength failing to reach the Mises stress.

Thus, when the tool-holding member is made of specialty steel having a austenitic structure, (1) shrinkage fitting can be achieved even at as low a temperature as 500° C. or lower while sufficiently absorbing the tolerances of the tool shank and the tool-holding member because of a large thermal expansion coefficient, and (2) the fixing of the tool shank will never be insufficient even after repeated shrinkage fitting because of a large after-heating yield strength.

Further, because the specialty steel having an austenitic structure is hardly subjected to temper color (oxide layer), the tool-holding member made of such specialty steel does not suffer from decrease in gripping strength and change of an inner diameter of the aperture thereof.

[2] Structure of tool holder (1) First Embodiment (only separate tool-holding member is made of austenitic steel)

In the tool holder in accordance with the first embodiment of the present invention, a tool-holding member 6 is separate from a tool holder body 11 having a portion adapted to be connected to a machining center and a manipulator-engaging portion, and only the tool-holding member 6 is made of austenitic steel.

The tool-holding member 6 shown in FIG. 1 has a through-hole or aperture 61 for firmly holding the tool shank (not shown) by shrinkage fitting, a tapered portion 62 with which the tool-holding member 6 is fixed to the tool holder body 11, and a threaded portion 63 for fixing the tool-holding member 6 to the tool holder body 11. With the tool-holding member 6 separate and detachable from the tool holder body 11 that is mounted to the machining center, it is possible to efficiently carry out shrinkage fitting for shortened heating and cooling time. Because the specialty steel having an austenitic structure is generally poor in machinability, only the tool-holding member 6 may be made of the austenitic steel to minimize the working cost.

Figure 2:
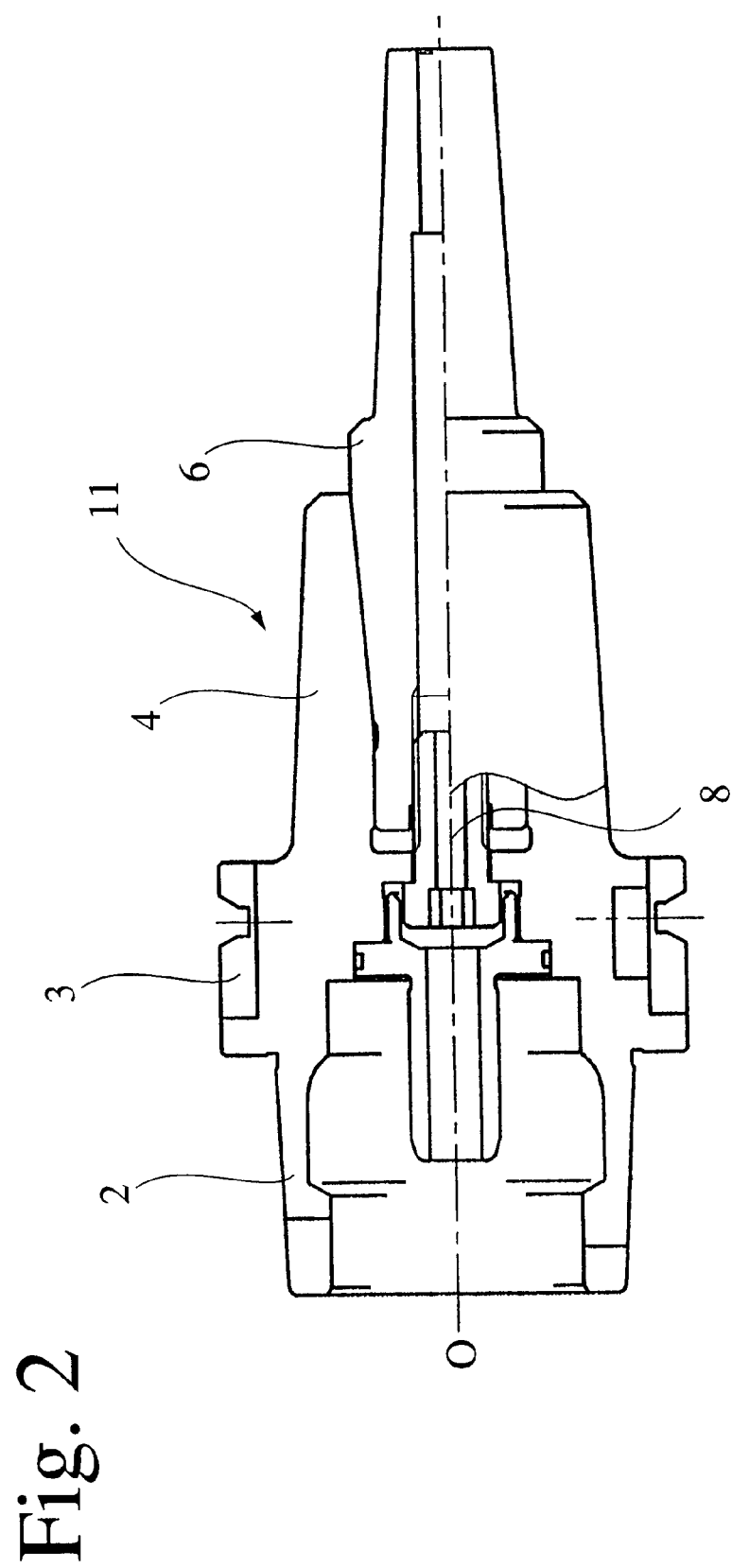
FIG. 2 is a partially cross-sectional, side view showing the tool-holding member shown in FIG. 1, which is fixed to a tool holder body.

As shown in FIG. 2, the tool holder body 11 is a type of constraint with two planes, having a tapered connecting portion 2, a manipulator-engaging portion 3, and a chuck portion 4 for holding the tool-holding member 6. The tool-holding member 6 may be detachably fixed to the aperture of the chuck portion 4 by screws 8.

Figure 3:
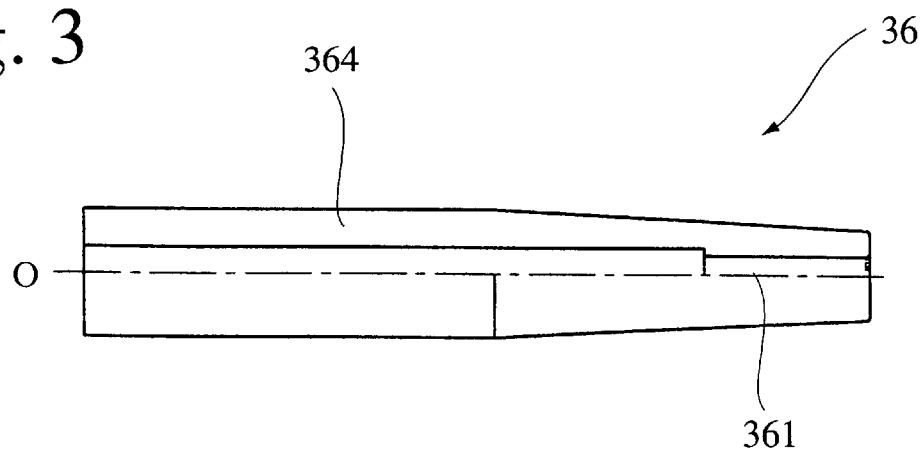
FIG. 3 is a partially cross-sectional, side view showing a tool-holding member in a shrinkage-fit tool holder in accordance with the first embodiment of the present invention.

FIG. 3 shows another example of the tool-holding member in accordance with this embodiment. Though this tool-holding member 36 has an aperture 361 for fixing a tool shank in a front portion, it has a straight hollow cylindrical portion 364 in a rear portion unlike in FIG. 1.

Figure 4:
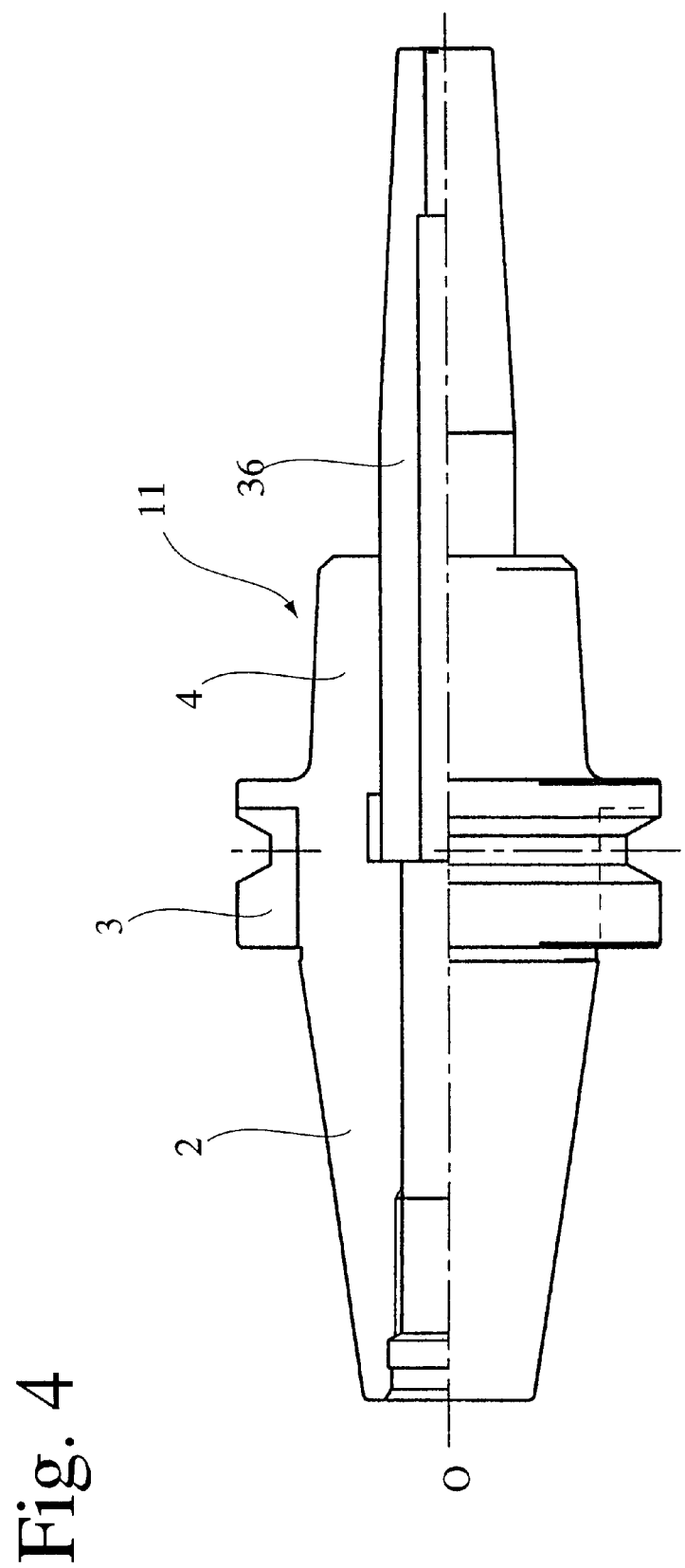
FIG. 4 is a partially cross-sectional, side view showing an assembly-type, single-plane-constrained, shrinkage-fit tool holder in accordance with the first embodiment of the present invention.

FIG. 4 shows the tool-holding member 36 of FIG. 3 mounted to a tool holder body 11. The tool holder body 11 is of a type of constraint with a single plane, having a tapered connecting portion 2, a manipulator-engaging portion 3, and a chuck portion 4 for firmly holding a tool-holding member 36. The tool-holding member 36 may be fixed to the chuck portion 4 by various methods such as brazing, welding, shrinkage fitting, etc.

Figure 5:
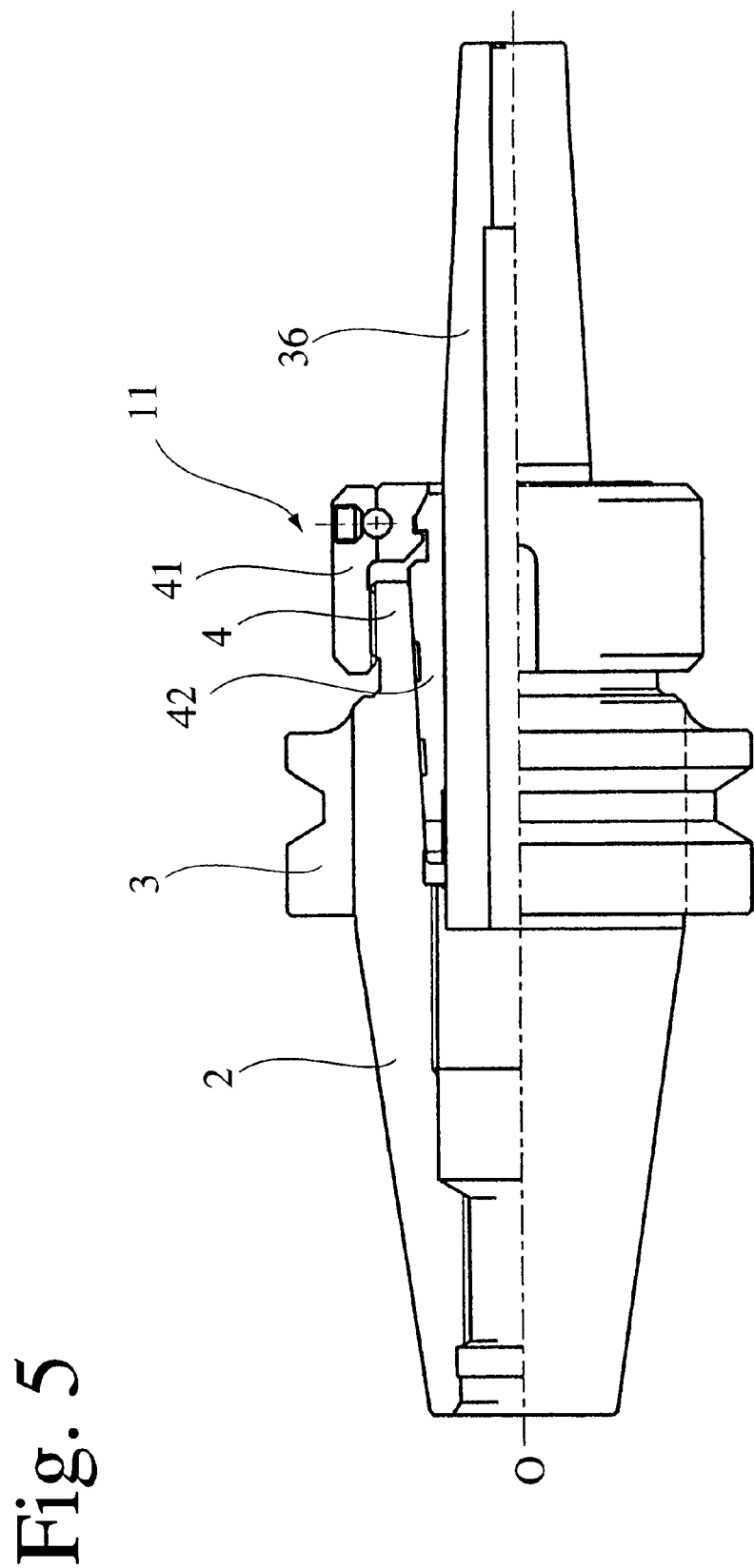
FIG. 5 is a partially cross-sectional, side view showing a collet-type, shrinkage-fit tool holder in accordance with the first embodiment of the present invention.

FIG. 5 shows the tool-holding member 36 of FIG. 3 mounted to a collet-type tool holder body 11. The tool-holding member 36 is fastened by the collet 42 and fixed by threading nuts 41.

Figure 6:
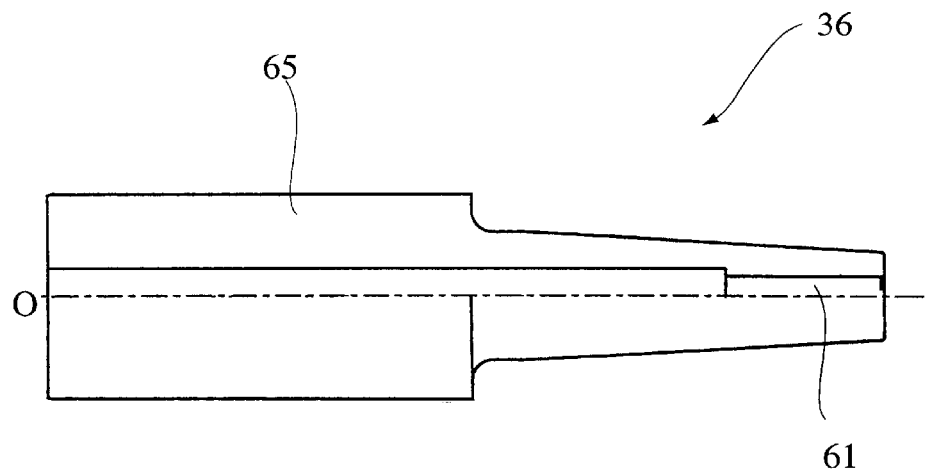
FIG. 6 is a partially cross-sectional, side view showing a tool-holding member in a shrinkage-fit tool holder in accordance with the first embodiment of the present invention.

FIG. 6 shows another example of the tool-holding member. The tool-holding member 36 has an aperture 61 for firmly holding the tool shank by shrinkage fitting and a hollow cylindrical portion 65 for fixing the tool holder body 11.

Figure 7:
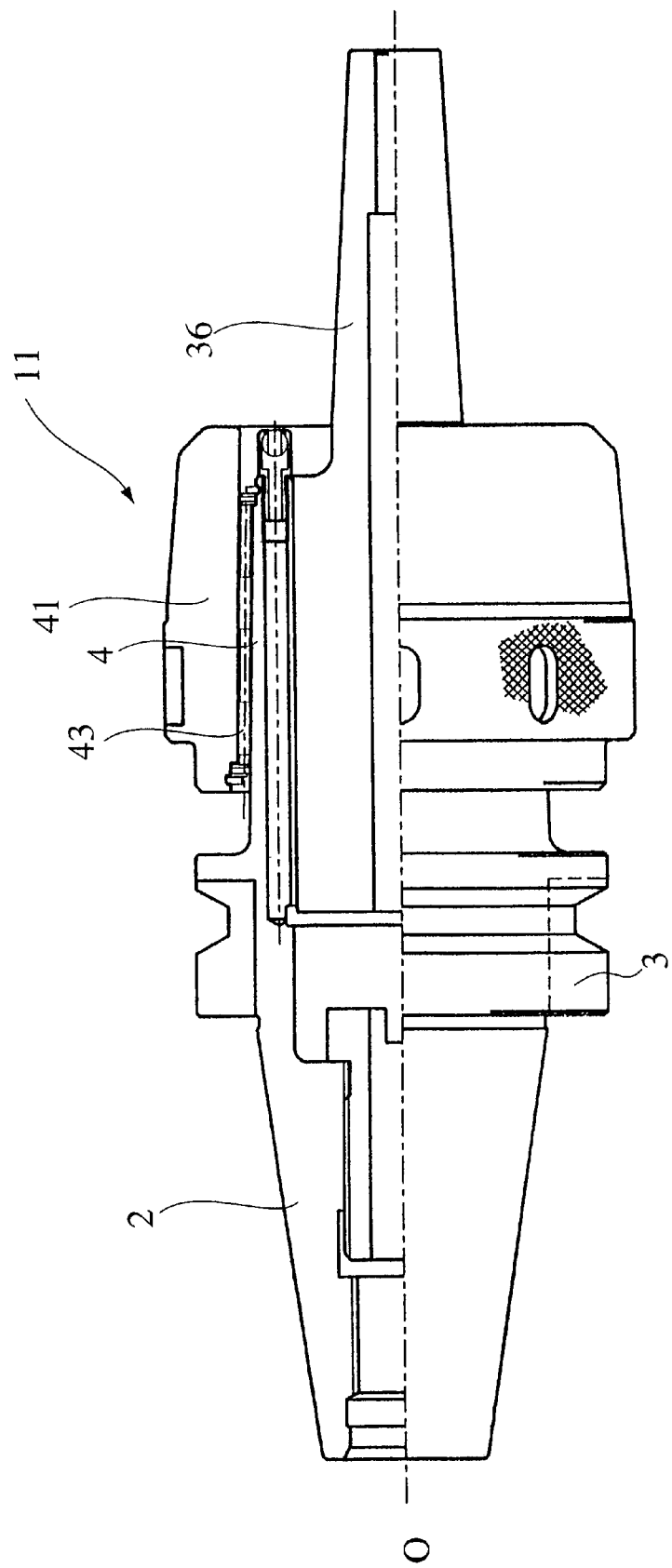
FIG. 7 is a partially cross-sectional, side view showing a shrinkage-fit tool-holding member in accordance with the first embodiment of the present invention, which is fixed to a conventional needle roller-type tool holder.

FIG. 7 shows the tool-holding member 36 of FIG. 6 mounted to a needle roller-type tool holder body 11. The tool-holding member 36 is inserted into an aperture of a chuck portion 4, and fixed by threading nuts 41 and fastened by needle rollers 43.

Figure 8:
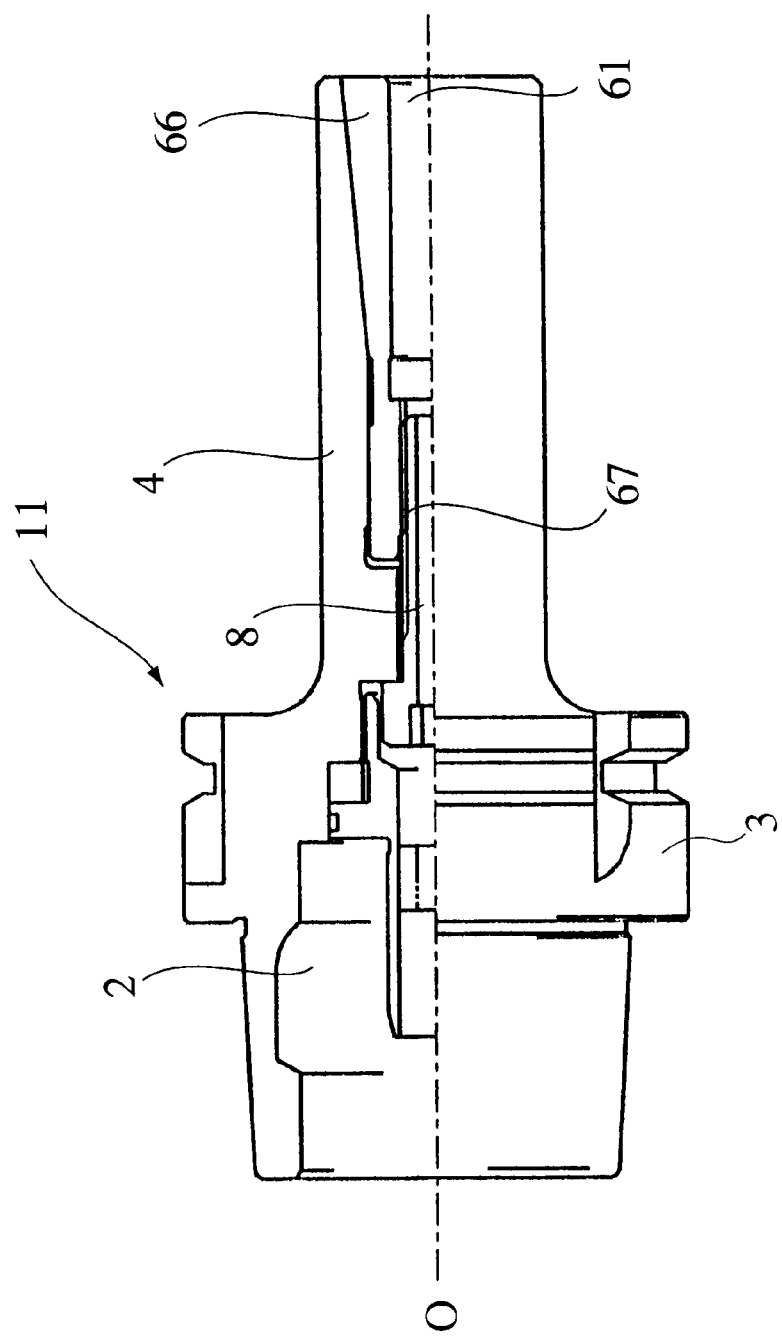
FIG. 8 is a partially cross-sectional, side view showing a collet-type, two-plane-constrained, shrinkage-fit tool holder in accordance with the first embodiment of the present invention.

FIG. 8 shows a collet-type, tool-holding member 66 mounted to a collet-type, two-plane-constrained, tool holder. The tool-holding member 66 is entirely cylindrical, having a tapered portion complementary to the tapered inner surface of the chuck portion 4 of the tool holder body 11 on the front side and a threaded portion 67 in an inner surface on the rear side. The tapered portion of the tool-holding member 66 is provided with an aperture 61 for fastening the tool shank. The tool-holding member 66 is fixed to the tool holder body 11 by threading screws 8 into a threaded portion 67 of the tool-holding member 66 in a rear portion. Because the tool shank is fixed by shrinkage fitting, the collet-type, tool-holding member 66 does not have slits in the tapered portion.

Figure 9:
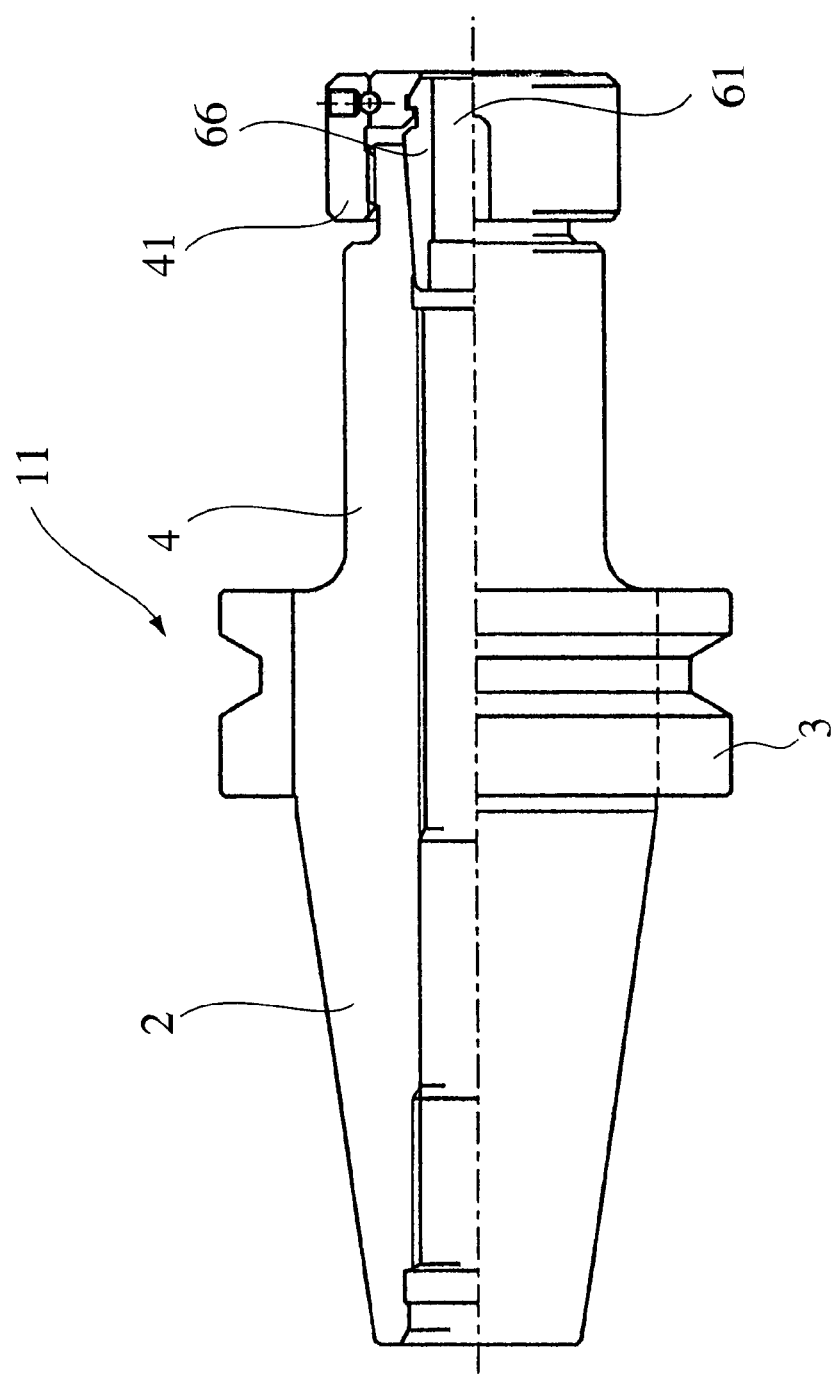
FIG. 9 is a partially cross-sectional, side view showing a collet-type, single-plane-constrained, shrinkage-fit tool holder in accordance with the first embodiment of the present invention.

FIG. 9 shows another example of a collet-type, tool-holding member mounted to a collet-type, single-plane-constrained, tool holder body 11. The tool-holding member 66 is entirely cylindrical without slits, having a conical aperture having a tapered surface complementary to a tapered inner surface of a chuck portion 4 of the tool holder body 11 in a front portion. The tool-holding member 66 has an aperture 61 for firmly holding the tool shank by shrinkage fitting in a front portion. The tool-holding member 66 is fixed to the tool holder body 11 by nuts 41.

Figure 10:
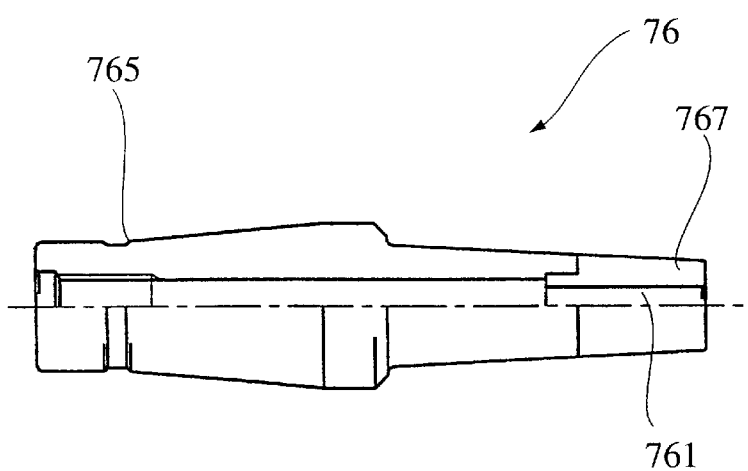
FIG. 10 is a partially cross-sectional, side view showing a tool-holding member in a shrinkage-fit tool holder in accordance with the first embodiment of the present invention.

FIG. 10 shows an example of a tool-holding member, only a front portion thereof being made of specialty steel having an austenitic structure. A front portion 767 of the tool-holding member 76 has an aperture 761 for firmly holding the tool shank by shrinkage fitting. The tool-holding member 76 has a tapered portion 765 fixed to the tool holder body 11 in a rear portion. The other portion of the tool-holding member 76 may be made of usual steel.

Figure 11:
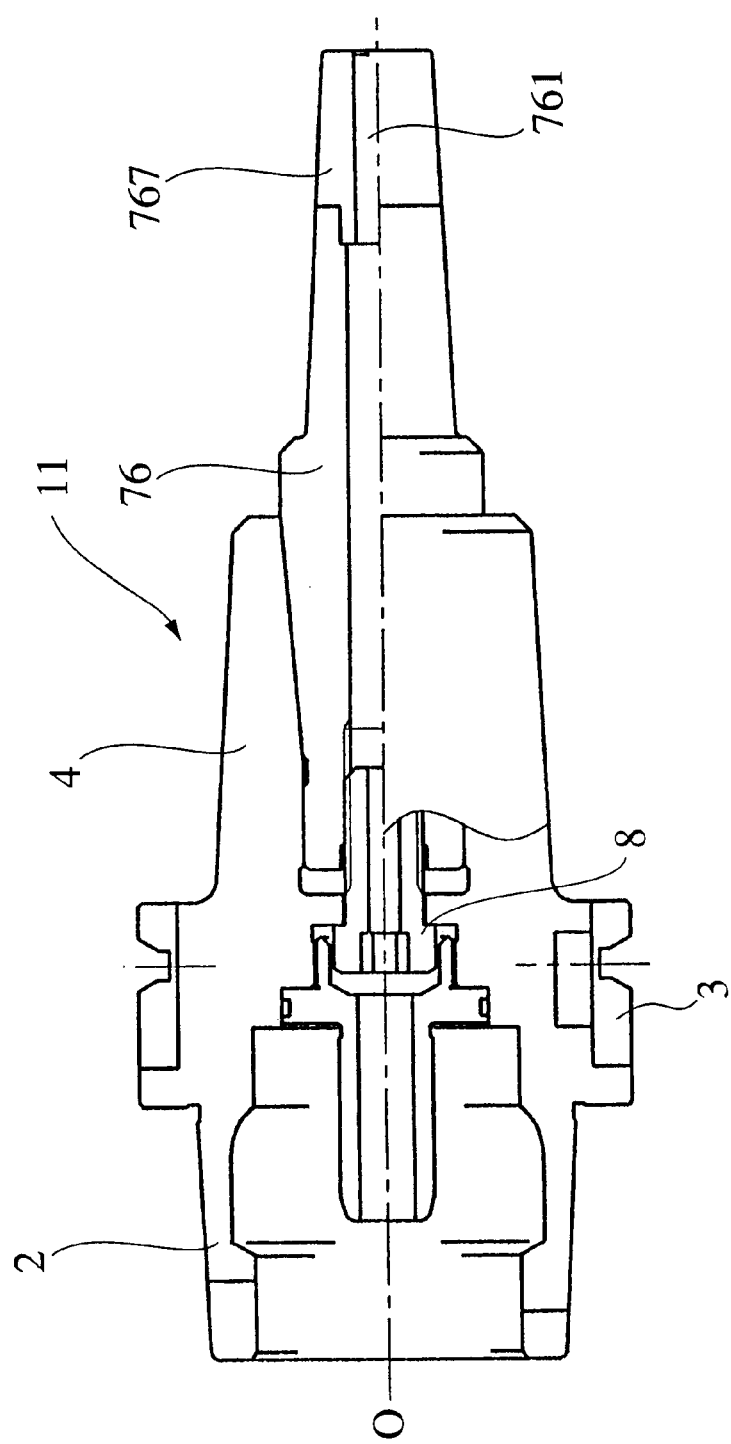
FIG. 11 is a partially cross-sectional, side view showing an detachable, two-plane-constrained, shrinkage-fit tool holder in accordance with the first embodiment of the present invention.

FIG. 11 shows the tool-holding member 76 of FIG. 10 mounted to a tool holder body 11. The tool holder body 11 is a type of constraint with two planes, having a tapered connecting portion 2, a manipulator-engaging portion 3, and a chuck portion 4 for firmly holding a tool. The tool-holding member 76 may be detachably fixed to an aperture of the chuck portion 4 by screws 8.

Figure 12:
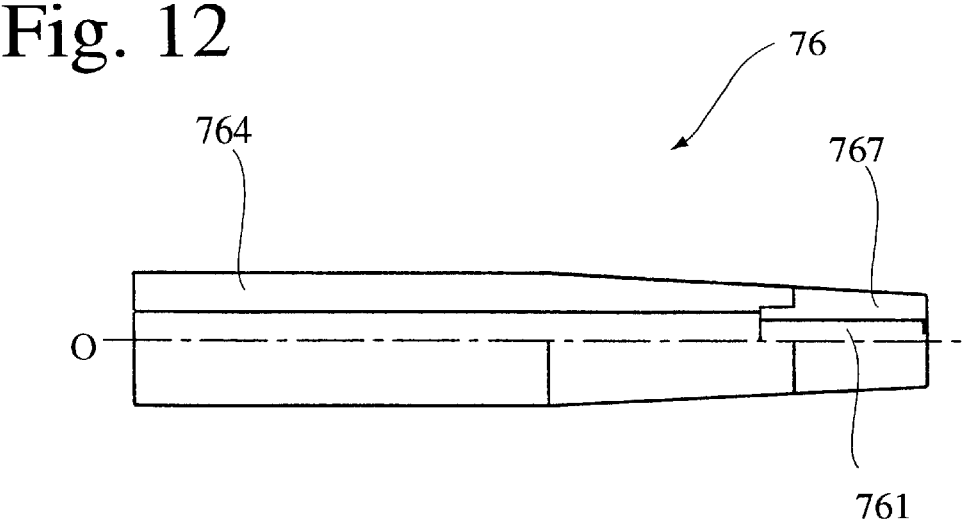
FIG. 12 is a partially cross-sectional, side view showing a tool-holding member in a shrinkage-fit tool holder in accordance with the first embodiment of the present invention.

FIG. 12 shows another example of a tool-holding member 76, only a front portion 767 thereof being made of specialty steel having an austenitic structure. The front portion 767 of the tool-holding member 76 has an aperture 761 for firmly holding the tool shank by shrinkage fitting. The rear portion of the tool-holding member 76 has a straight hollow cylindrical portion 764 unlike in FIG. 10.

Figure 13:
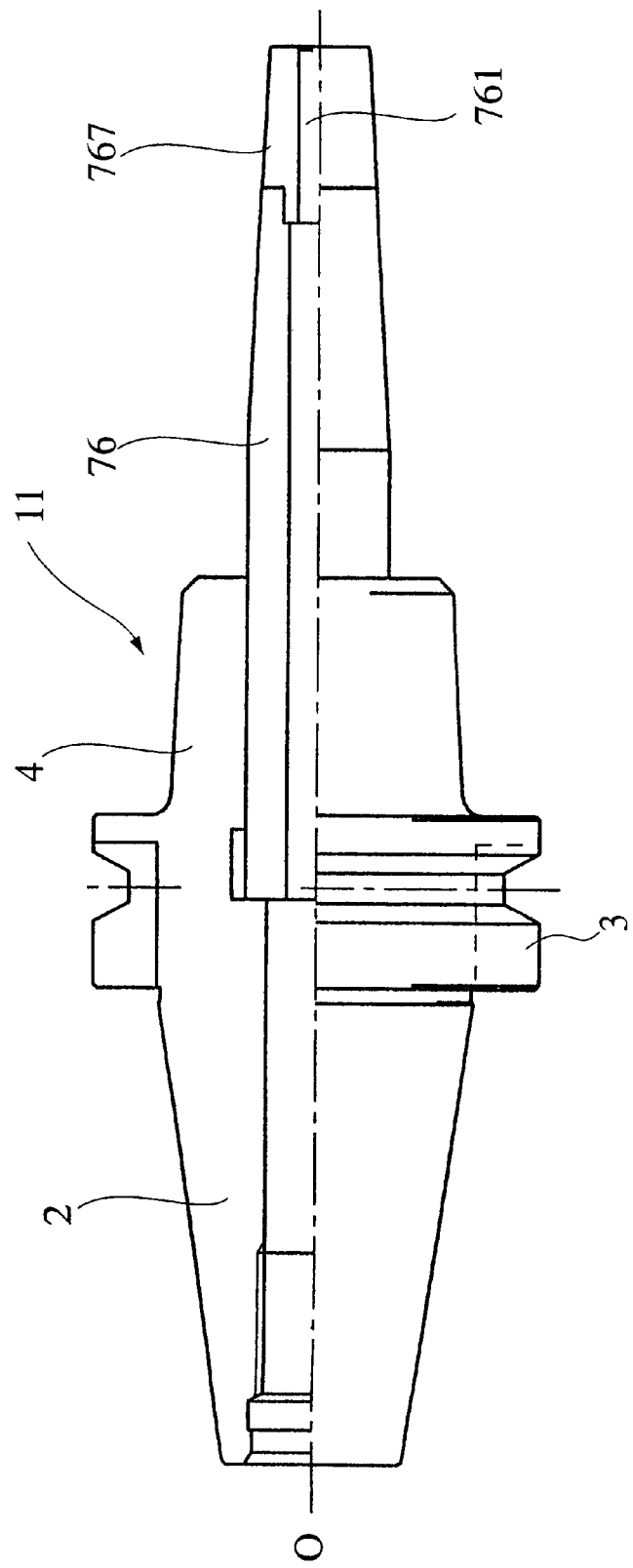
FIG. 13 is a partially cross-sectional, side view showing an assembly-type, single-plane-constrained, shrinage-fit tool holder in accordance with the first embodiment of the present invention.

FIG. 13 shows the tool-holding member 76 of FIG. 12 mounted to a tool holder body 11. The tool holder body 11 is of a type of constraint with a single plane, having a tapered connecting portion 2, a manipulator-engaging portion 3, and a chuck portion 4 for firmly holding the tool-holding member. The tool-holding member 76 may be fixed to the chuck portion 4 by brazing, welding, shrinkage fitting, etc.

Figure 14:
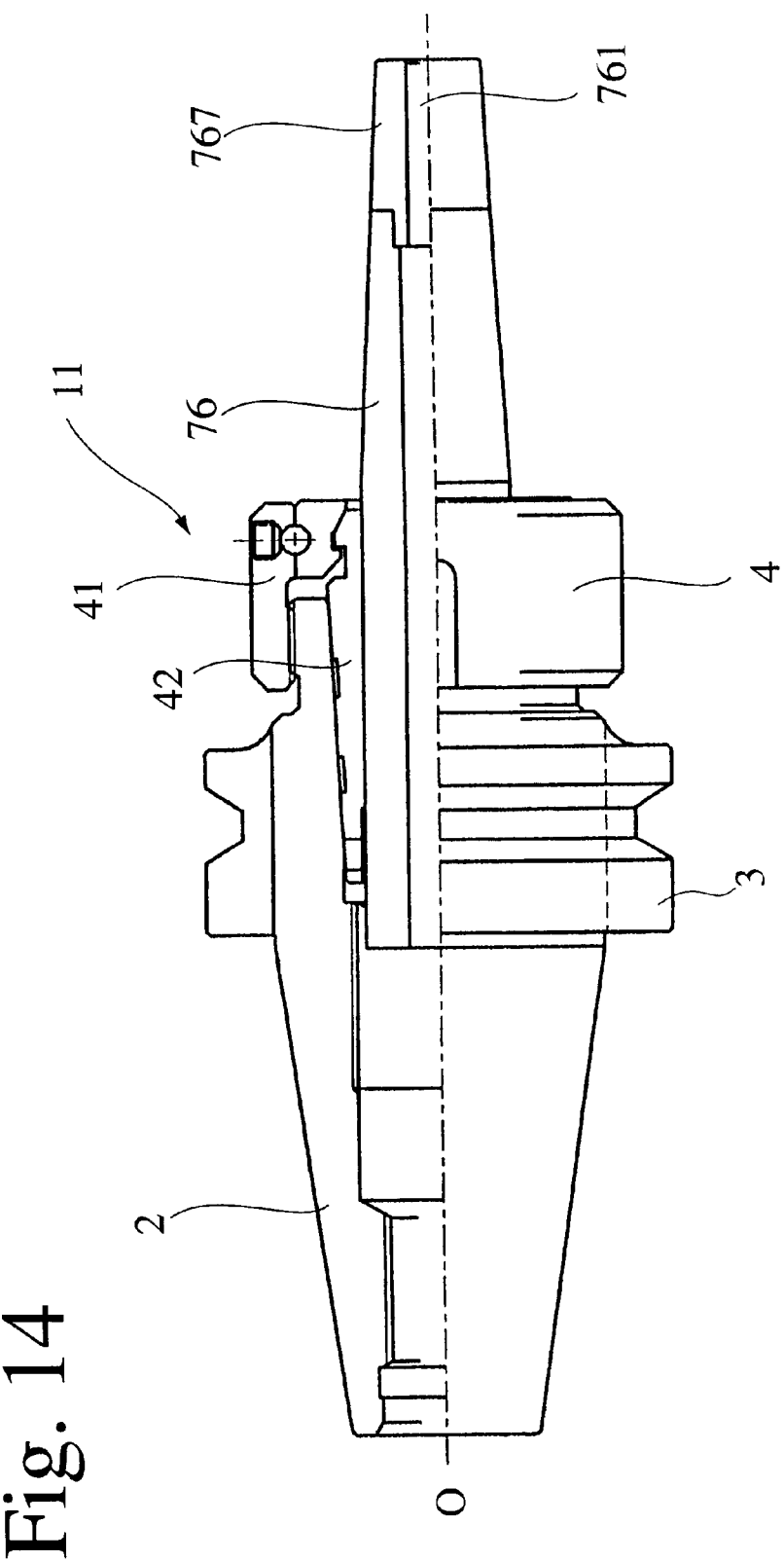
FIG. 14 is a partially cross-sectional, side view showing a collet-type, shrinkage-fit tool holder in accordance with the first embodiment of the present invention.

FIG. 14 shows the tool-holding member 76 of FIG. 12 mounted to a collet-type, tool holder body 11. The tool-holding member 76 is fastened by the collet 42 and fixed by nuts 41.

Figure 15:
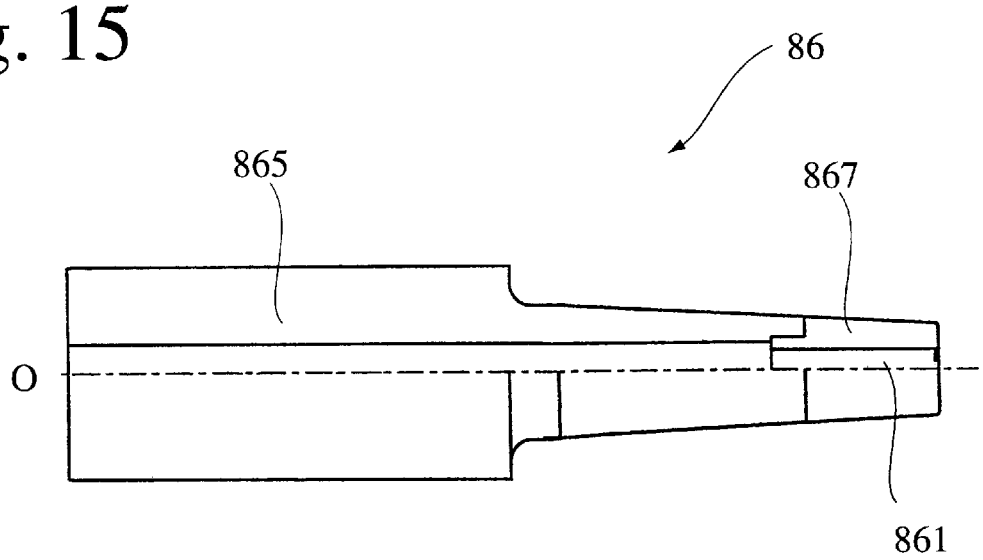
FIG. 15 is a partially cross-sectional, side view showing a tool-holding member in a shrinkage-fit tool holder in accordance with the first embodiment of the present invention.

FIG. 15 shows another example of a tool-holding member, only a front portion thereof being made of specialty steel having an austenitic structure. A front portion 867 of the tool-holding member 86 has an aperture 861 for firmly holding the tool shank by shrinkage fitting, while a rear portion of the tool-holding member 86 has a hollow cylindrical portion 865 for fixing to the tool holder body 11.

Figure 16:
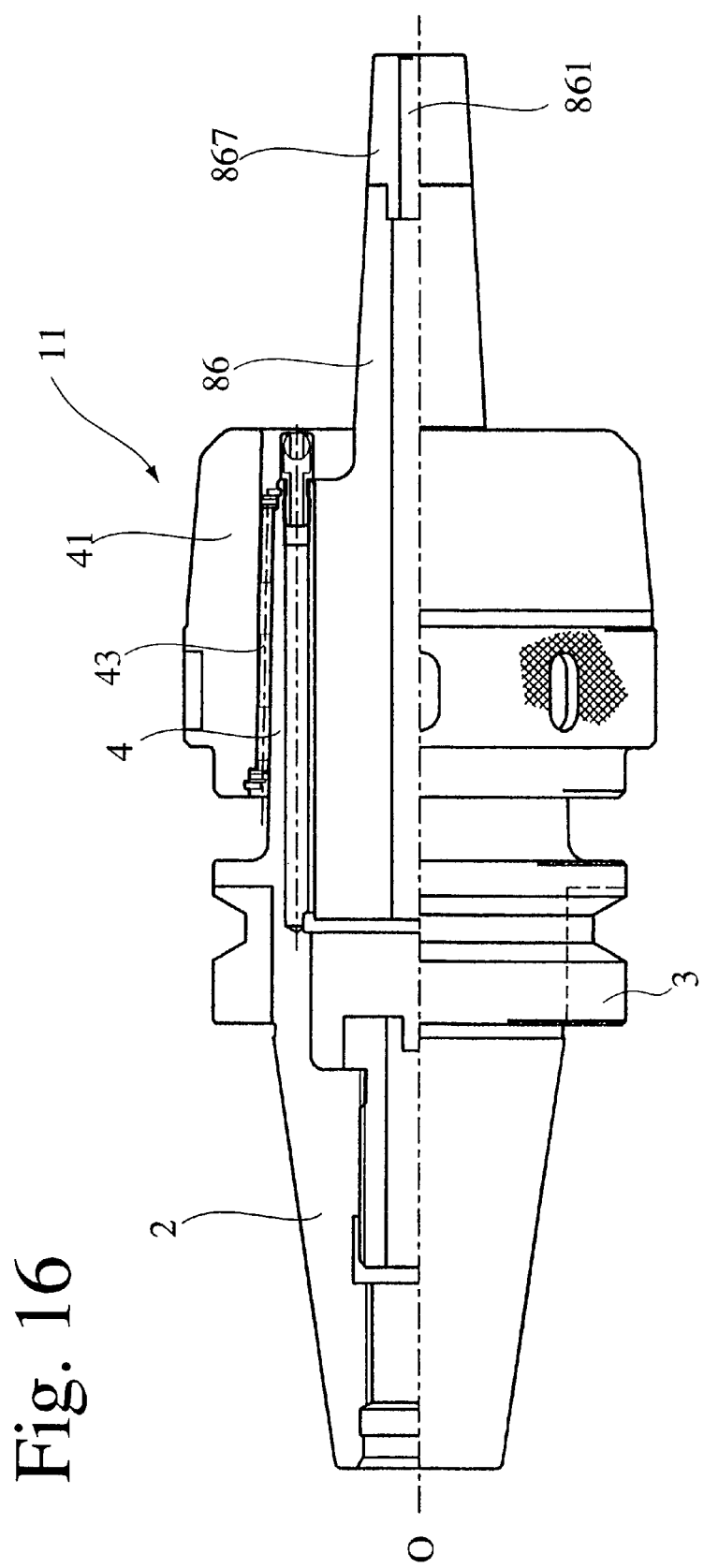
FIG. 16 is a partially cross-sectional, side view showing a shrinkage-fit tool-holding member in accordance with the first embodiment of the present invention, which is fixed to a conventional needle roller-type tool holder.

FIG. 16 shows the tool-holding member 86 of FIG. 15 mounted to a needle roller-type, tool holder body 11. The tool-holding member 86 is inserted into an aperture of a chuck portion 4 and fixed by screwing nuts 41 and gripping by needle rollers 43.

(2) Second Embodiment (tool-holding portion integral with tool holder body)

Figure 17:
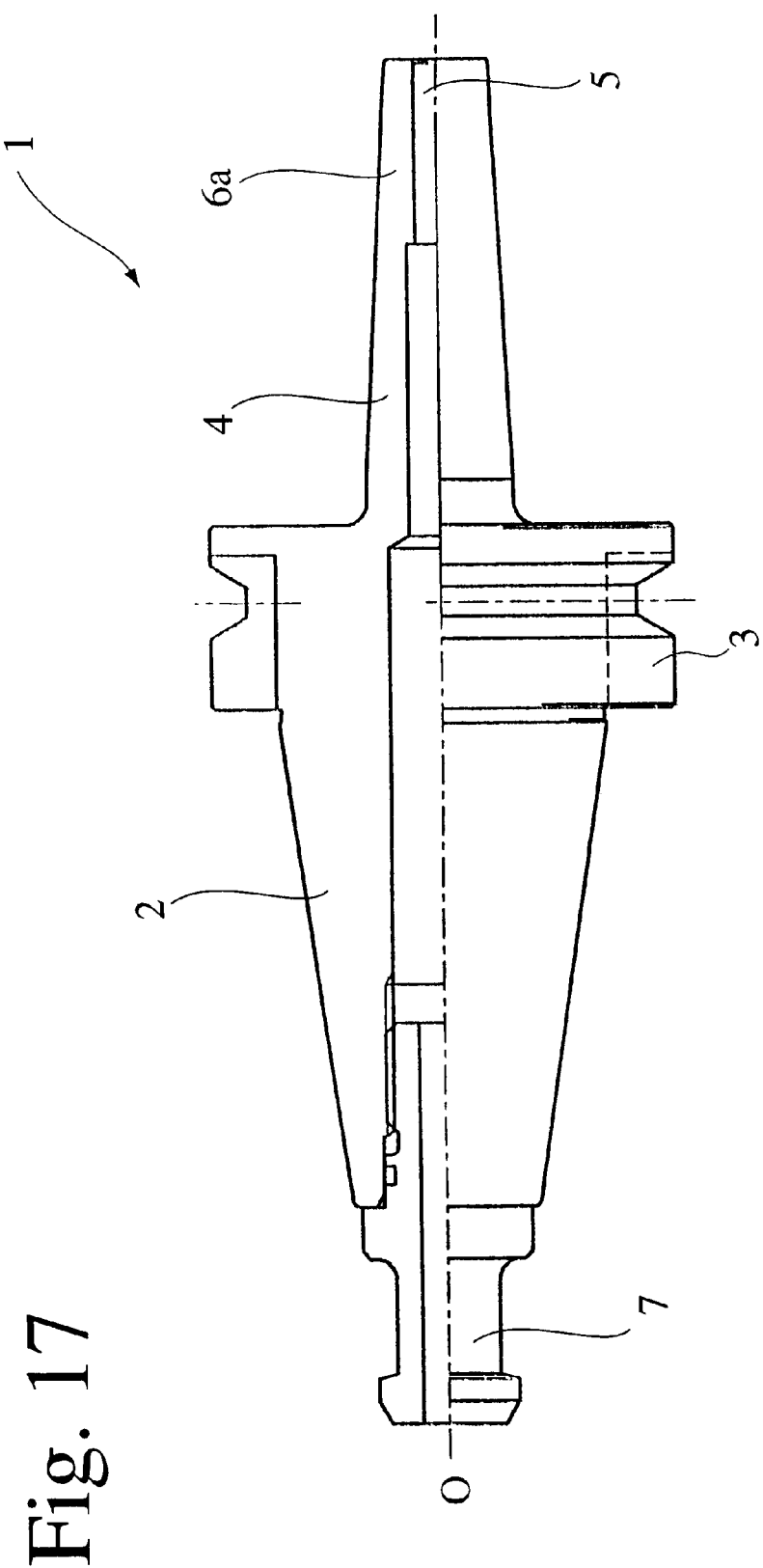
FIG. 17 is a partially cross-sectional, side view showing an integral, single-plane-constrained, shrinkage-fit tool holder in accordance with the second embodiment of the present invention.

FIG. 17 shows a shrinkage-fit tool holder in accordance with another embodiment of the present invention. This shrinkage-fit tool holder 1 is entirely made of specialty steel having an austenitic structure, having a tapered connecting portion 2 for connecting with a spindle of the machining center, a manipulator-engaging portion 3 and a chuck portion 4. A front portion of the chuck portion 4 serves as a tool-holding portion 6a, and the tool-holding portion 6a has an aperture 5 for firmly holding the tool shank. A reference numeral 7 indicates a pull stud.

Figure 18:
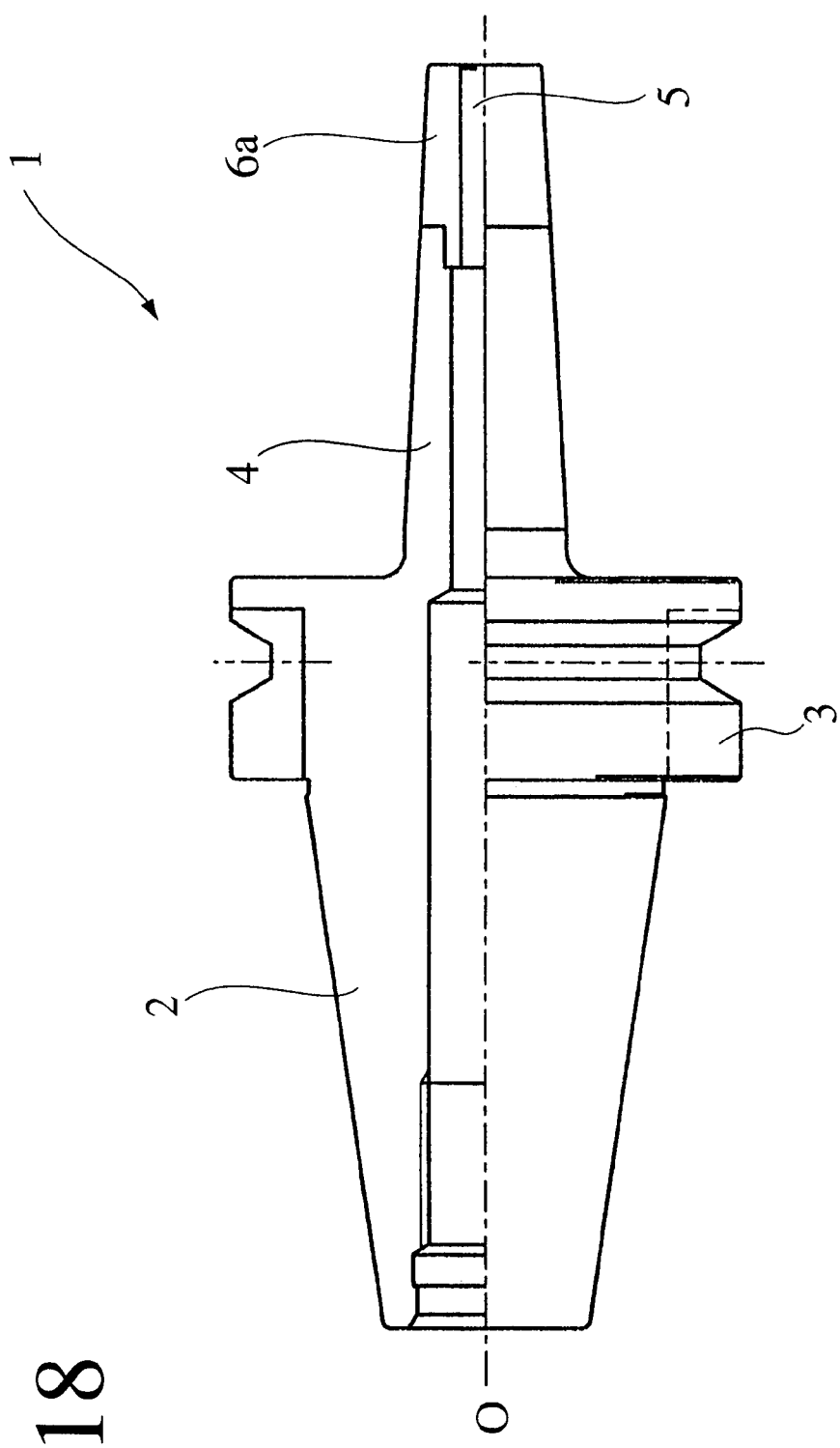
FIG. 18 is a partially cross-sectional, side view showing an integral, single-plane-constrained, shrinkage-fit tool holder in accordance with the second embodiment of the present invention.

FIG. 18 shows another example of a shrinkage-fit tool holder 1 having the same structure as that of the tool holder of FIG. 17, except that only a front portion thereof serving as a tool-holding portion 6a is made of specialty steel having an austenitic structure. Like the tool holder shown in FIG. 17, this shrinkage-fit tool holder 1 comprises a tapered connecting portion 2, a manipulator-engaginig portion 3, and a chuck portion 4 for firmly holding the tool, the chuck portion 4 being provided with a tool-holding portion 6a in a front portion. The tool-holding portion 6a has an aperture 5 for firmly holding the tool shank by shrinkage fitting.

(3) Third Embodiment (having apertures for supplying machining fluid or air)

To efficiently carry out machining of deep or complicatedly shaped work, a machining fluid or air should be supplied. In the case of a tool without apertures for supplying the machining fluid or air, the shrinkage-fit tool holder should be provided with such apertures.

Figure 19:
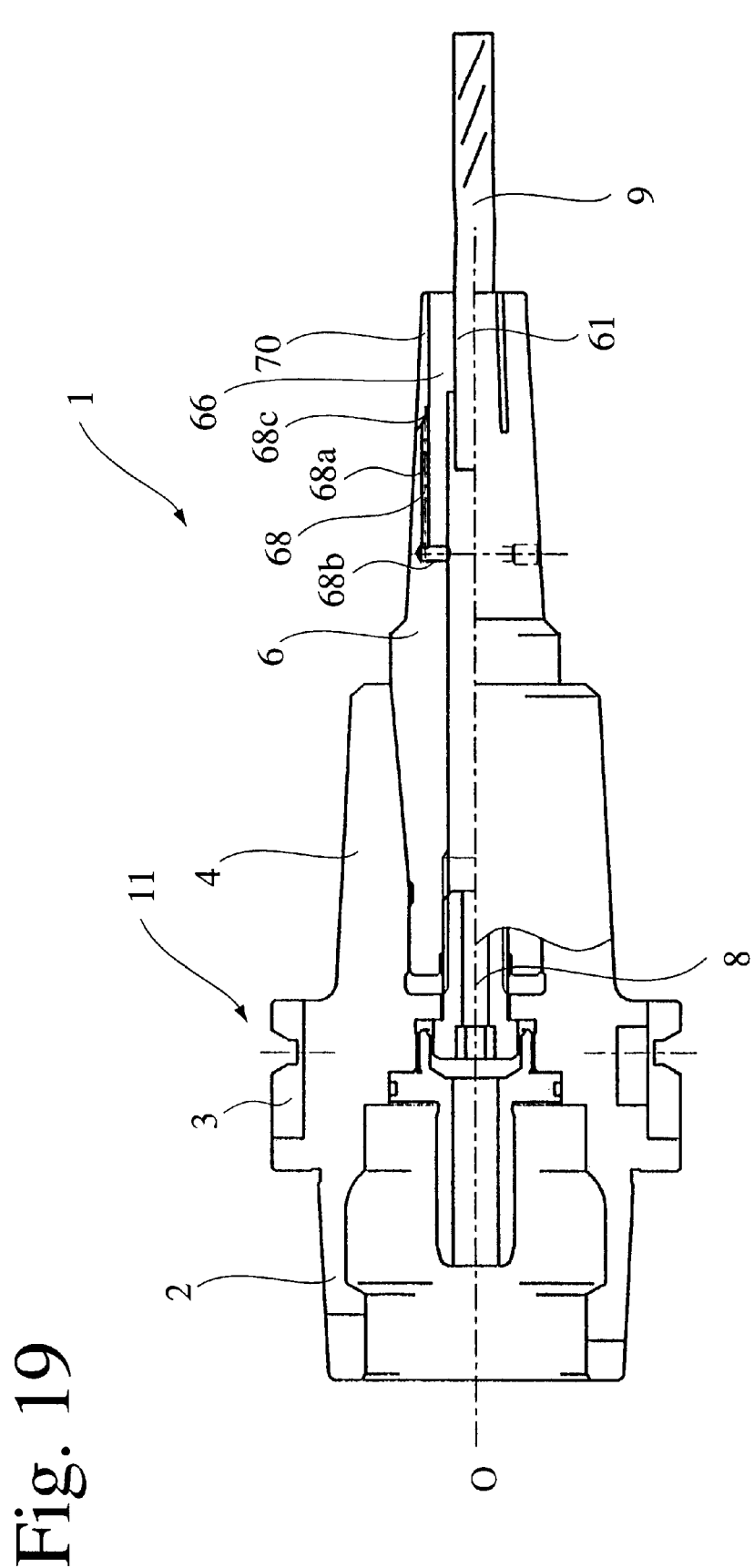
FIG. 19 is a partially cross-sectional, side view showing an detachable, two-plane-constrained, shrinkage-fit tool holder having apertures for supplying a machining fluid or air in accordance with the third embodiment of the present invention.
Figure 20:
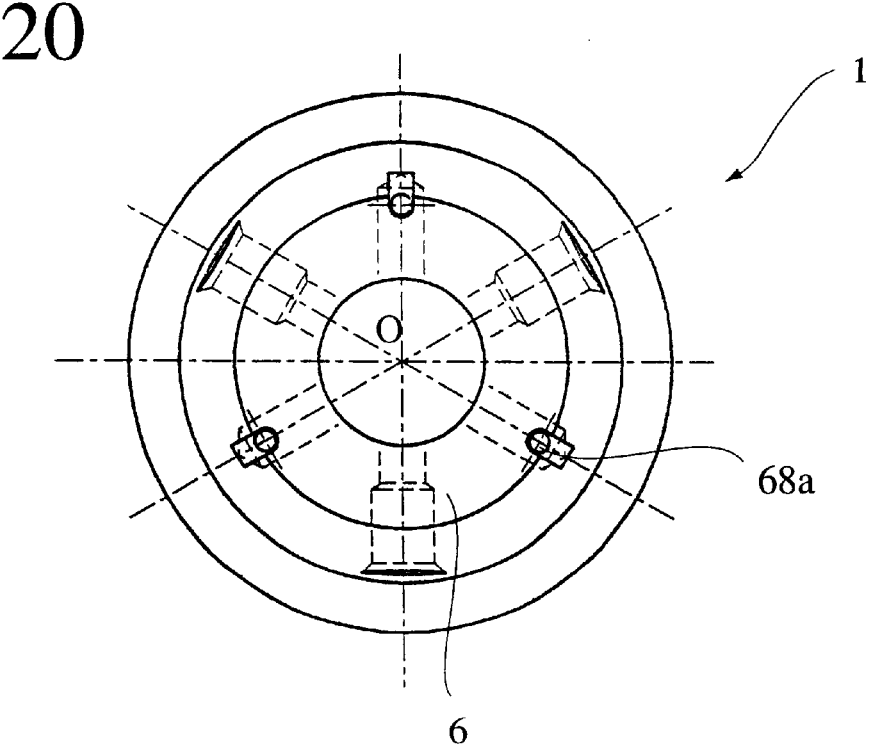
FIG. 20 is a plan view showing the shrinkage-fit tool holder of FIG. 19, from the side of the tool-holding member.
Figure 23:
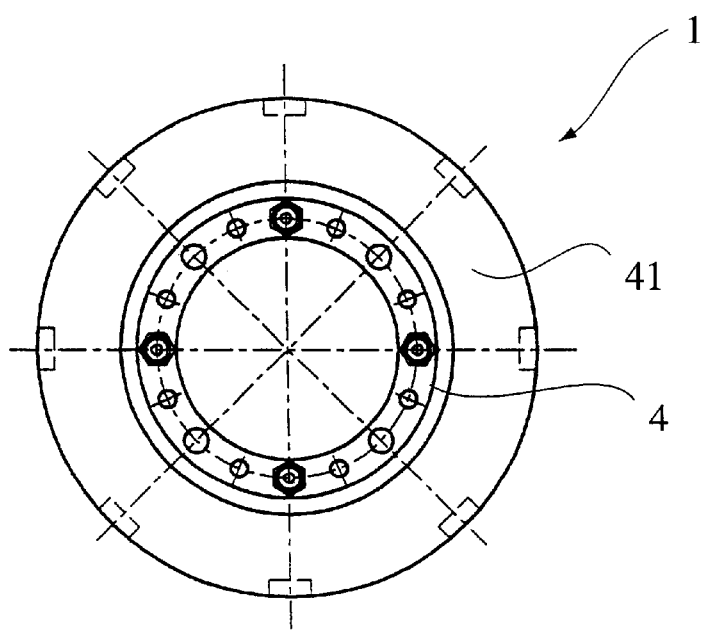
FIG. 23 is a front view showing the tool holder of FIG. 22, from the tool-mounting side.

FIGS. 19 and 20 show a shrinkage-fit tool holder 1 having a structure in which a tool-holding member 6 is mounted to a two-plane-constrained tool holder body 11. In this example, apertures 68 for supplying a machining fluid or air are formed in the tool-holding member 6. Each of three apertures 68 circumferentially disposed at regular intervals in the tool-holding member 6 consists of a portion 68a extending in parallel with the axis O of the tool holder 1, a portion 68b radially extending for communicating with the rear end of the parallel portion 68a and the aperture of the tool-holding member 6, and an opening 68c positioned at the tip end of the parallel portion 68a. It is preferred that the opening 68c is positioned more proximally than a tool-holding portion 66 of the tool-holding member 6, i.e. than the rear end of an aperture 61. Guide grooves 70 extend on an outer surface of the tool-holding member 6 in parallel with the axis O from the opening 68c to the tip end of the tool-holding member 6. The guide grooves 70 guide the machining fluid or air to the tip end of the tool. The rear end surface of each guide groove 70 having the opening 68c is preferably a curved surface. By guide grooves 70 having such structures, the machining fluid or air sprayed from the opening 68c is concentrated to the tip end of the tool without scattering.

The guide grooves 70 permit the parallel portions 68a of the apertures 68 to be relatively short, whereby the tool-holding member 6 can easily be worked. Also, the parallel portions 68a can be formed relatively near the outer surface of the tool-holding member 6, and the rear ends of the guide grooves 70 may be positioned more proximally than the rear end of the aperture 61, thereby avoiding the likelihood of decrease in the strength of the tool-holding member 6.

Figure 21:
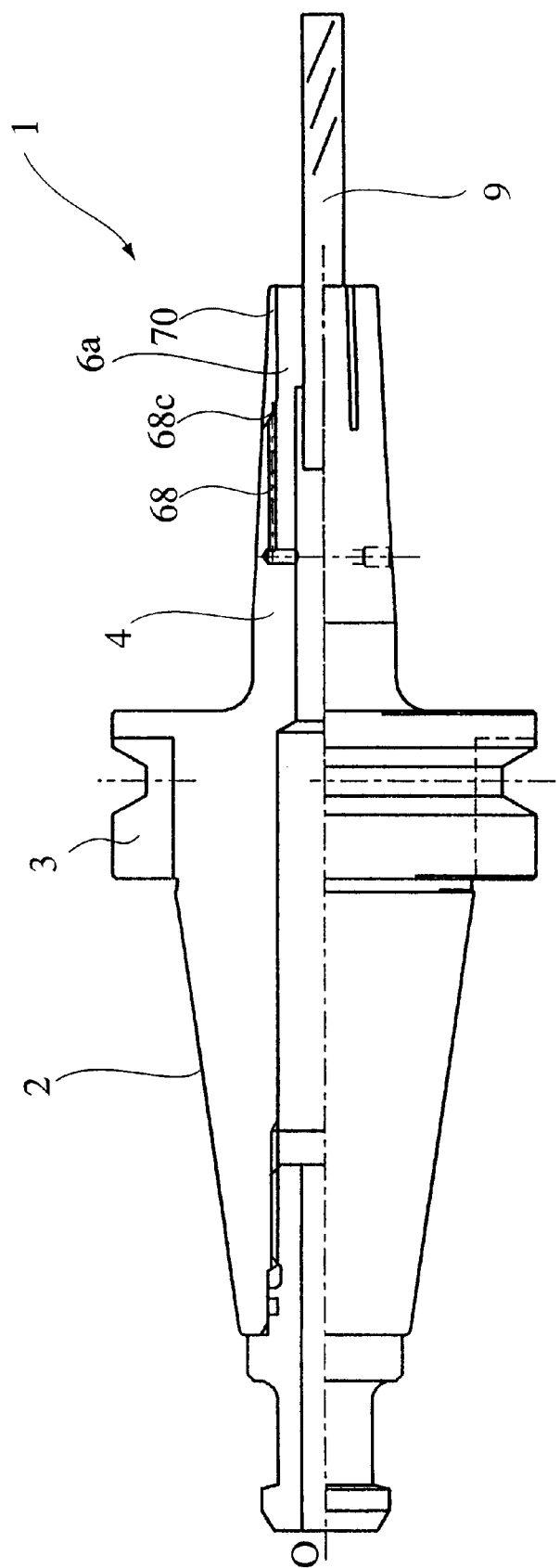
FIG. 21 is a partially cross-sectional, side view showing an integral, single-plane-constrained, shrinkage-fit tool holder having apertures in accordance with the third embodiment of the present invention.
Figure 22:
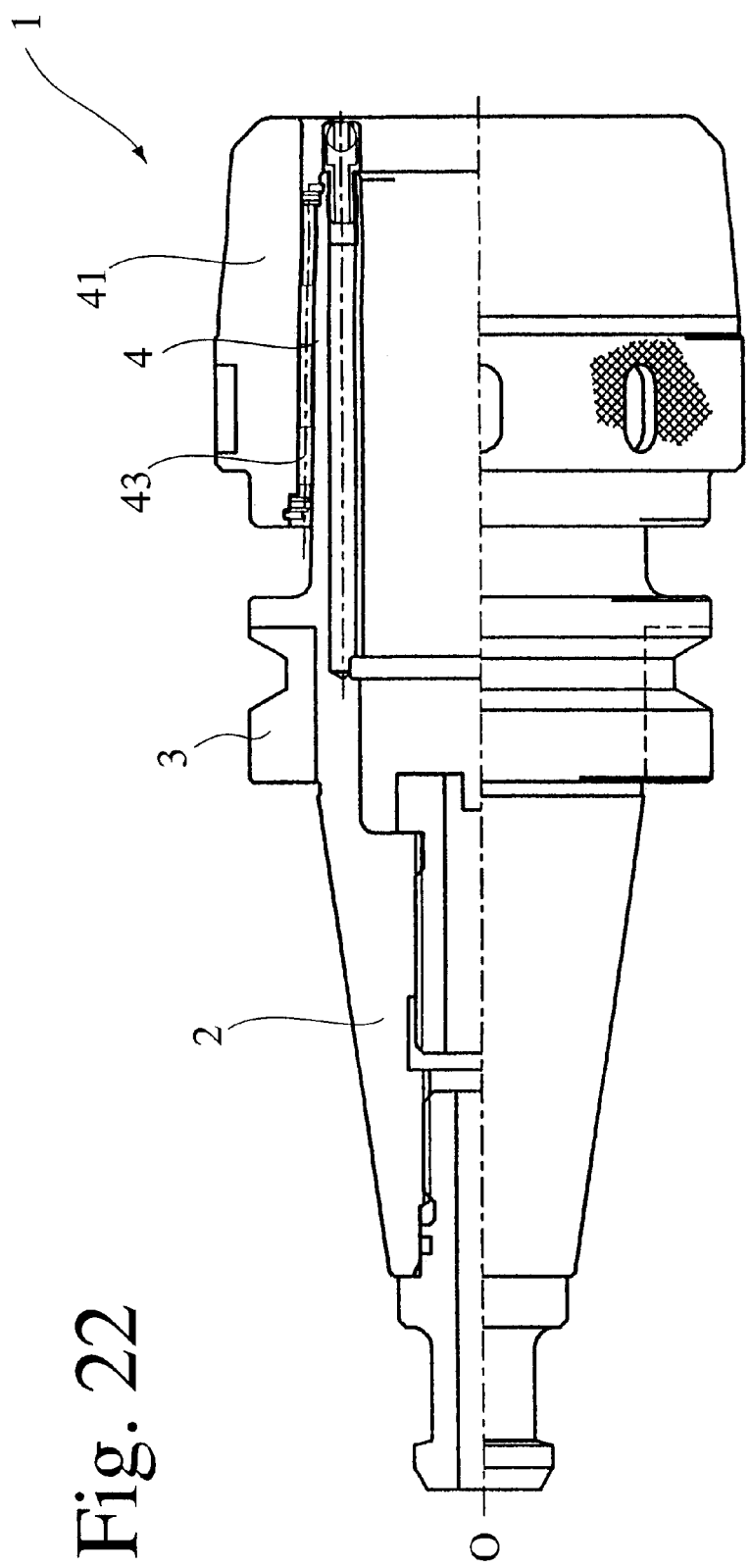
FIG. 22 is a partially cross-sectional, side view showing a conventional needle roller-type tool holder.
Figure 24B:
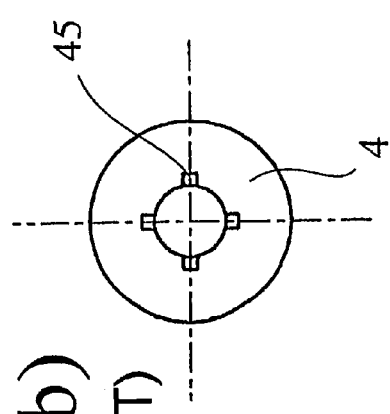
FIG. 24($a$) is a partially cross-sectional, side view showing an example of conventional shrinkage-fit tool holders.
Figure 24A:
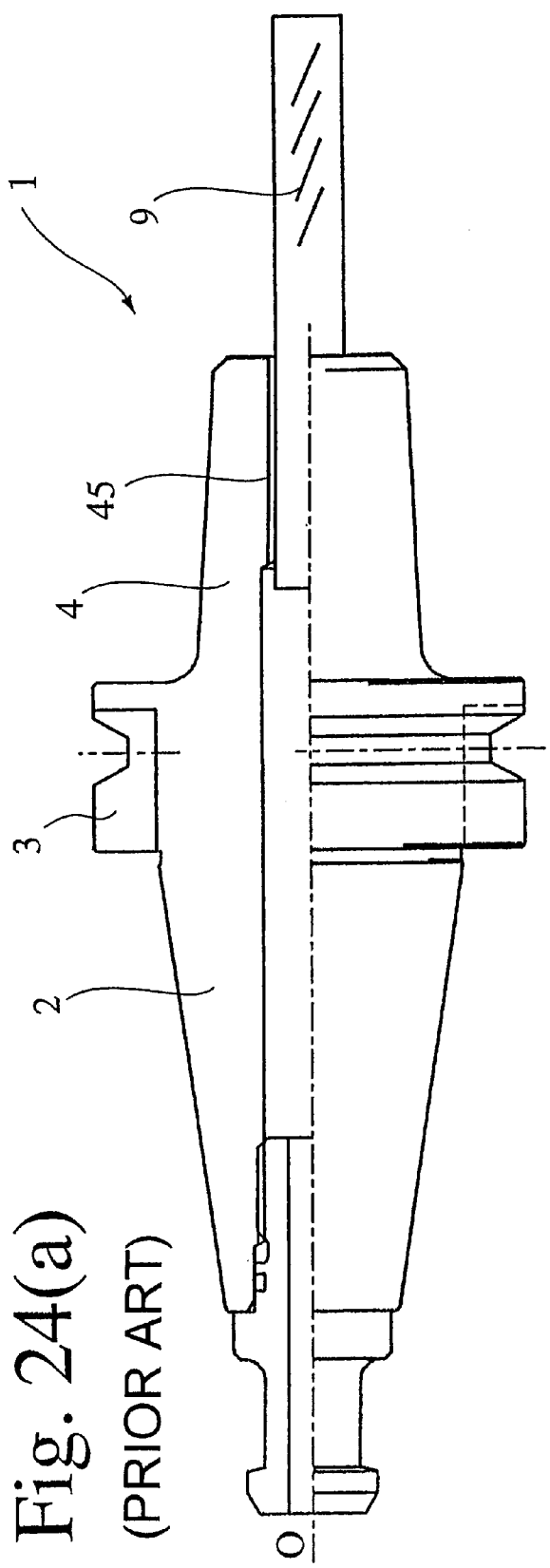
Figure 25A:
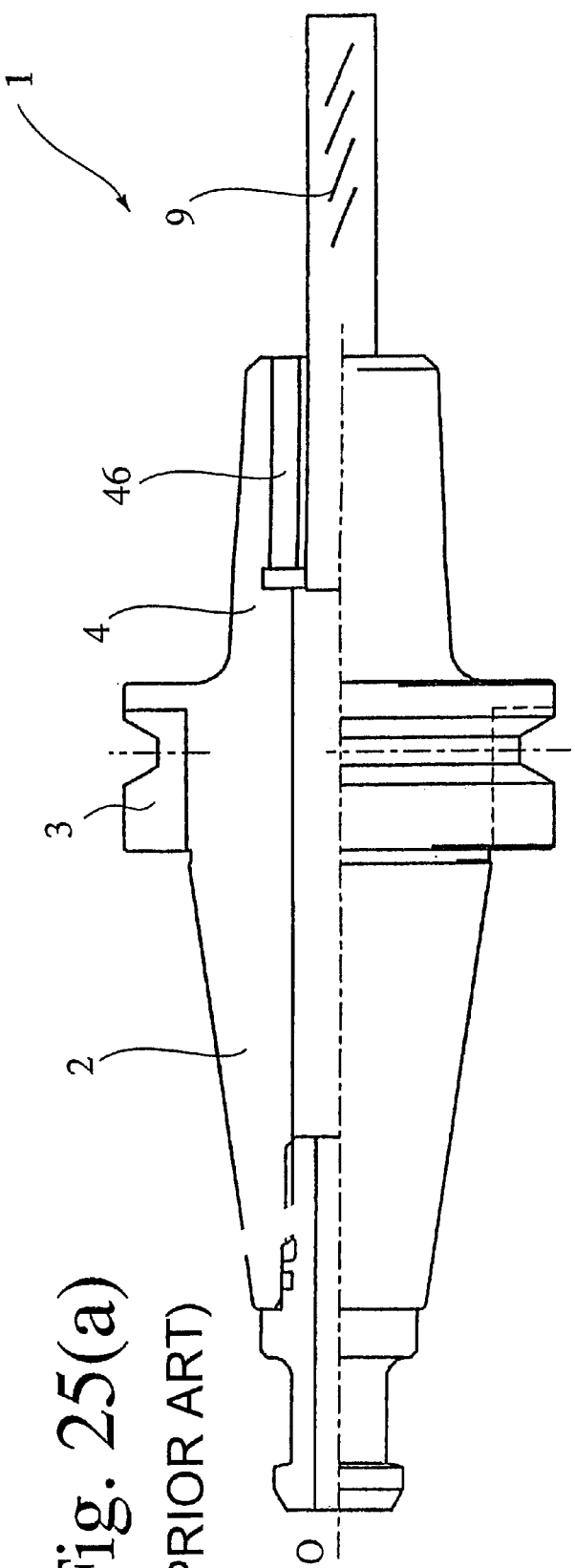
FIG. 25($a$) is a partially cross-sectional, side view showing another example of conventional shrinkage-fit tool holders.
Figure 25B:
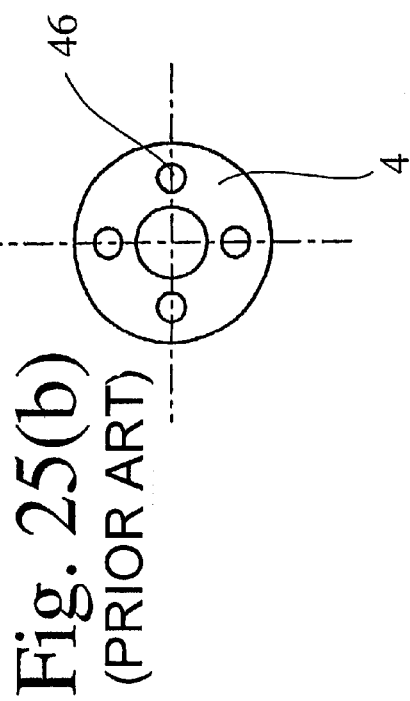

FIG. 21 shows a shrinkage-fit tool holder 1 having substantially the same structure as that shown in FIG. 19, except that a tool-holding member 6 is integral with a tool holder 1. The tool holder 1 integrally comprises a portion 2 adapted to be connected to the machining center, a manipulator-engaging portion 3, a chuck portion 4 and a tool-holding portion 6a in a front portion of the chuck portion 4. In this case, the apertures 68 formed in the tool-holding portion 6a or in the chuck portion 4 connected thereto have the same function as those shown in FIG. 19.

The present invention will be explained in further detail by the following examples without intention of restricting the scope of the present invention.

EXAMPLE 1, COMPARATIVE EXAMPLES 1–3

A cemented carbide end mill (JIS P10, linear thermal expansion coefficient $\alpha = 6.5 \times 10^{-6}/°$ C.) having a shank diameter of 6 mm was prepared, and a tool-holding member (inner diameter: 6 mm, outer diameter: 12 mm) having an inner diameter adapted to the shank diameter as shown in FIG. 1 was made of specialty steel having an austenitic structure (HPM75, available from Hitachi Metals, Ltd.). The solid-square, cemented carbide end mill had a tolerance of 0 $\mu$m to $-12$ $\mu$m, and the tool-holding member had an inner diameter having a tolerance of $-18$ $\mu$m to $-23$ $\mu$m.

The Mises stress of the solid-square, cemented carbide end mill at room temperature (20° C.) was calculated at the maximum interference of 23 $\mu$m. The calculation results are shown in Table 2 together with the linear thermal expansion coefficient $\alpha$ and a shrinkage-fitting temperature required for the above interference. In addition, the yield strength of the tool-holding member after heating to the shrinkage-fitting temperature (after-heating yield strength) was measured. The results are also shown in Table 2.

For comparison, tool-holding members were produced from SCM415, SCM440 and SUS304, respectively instead of HPM75. The resultant tool-holding members were measured with respect to Mises stress, a linear thermal expansion coefficient $\alpha$, a shrinkage-fitting temperature and after-heating yield strength in the same manner as in EXAMPLE 1. The measurement results are shown in Table 2.

TABLE 2

| No. | Material | Linear Expansion Co-efficient[1] | Shrinkage-Fitting Temp. (° C.) | Mises Stress[2] | After-Heating Yield Strength[2] | Comments |
|---|---|---|---|---|---|---|
| Ex. 1 | HPM75 | about 17 | 385 | 95.5 | ≧100 | Satisfactory |
| Comp. Ex. 1 | SCM415 | 11.2 | 836 | 95.5 | about 60 | Poor in Yield Strength |
| Comp. Ex. 2 | SCM440 | 13.0 | 610 | 95.5 | about 80 | Poor in Yield Strength |
| Comp. Ex. 3 | SUS304 | 18.4 | 322 | 95.5 | about 21 | Poor in Yield Strength |

Note:
[1]Unit: $\times 10^{-6}/°$ C.
[2]Unit: kgf/mm$^2$.

As is clear from Table 2, it was possible to achieve a larger after-heating yield strength than the Mises stress at a shrinkage-fitting temperature of 500° C. or lower, only when the specialty steel having an austenitic structure (HPM75) was used. In contrast, because the shrinkage-fitting temperature exceeded 500° C. in the cases of SCM415 and SCM440, there arose a problem of high-temperature shrinkage fitting. Also, in the case of SUS304, the resultant tool-holding member had extremely low after-heating yield strength, though the shrinkage-fitting temperature was low.

Next, each tool-holding member to which a cemented carbide end mill was shrinkage-fit was fix to a tool holder body shown in FIG. 2 to cut die steel (NAK80, available from Daido Steel, Co., Ltd.) under the following conditions:

Cutting tool: R3 coated cemented carbide ball end mill,
Revolution speed: 10,000 rpm,
Feed: 1,400 mm/min, and
Depth of cutting: 0.6 mm for rough cutting, and 0.1 mm for finishing.

As a result, cutting was carried out without problem in the case of the tool-holding member of EXAMPLE 1, while there was poor vibration accuracy due to distortion in the case of the tool-holding members of COMPARATIVE EXAMPLES 1 to 3, resulting in failure to obtaining a well-finished surfaces. In addition, when cutting was repeated after changing end mills, there were problems that the end mills slid, and that they could not be firmly fixed, etc.

EXAMPLE 2

Mises stress and shrinkage-fitting temperatures necessary therefor were calculated for various combinations of tool-holding members having different inner and outer diameters (AUS205, available from Aichi Steel, Corp., linear thermal expansion coefficient $\alpha=19\times10^{-6}/°$ C., yield strength=160 kgf/mm$^2$ or more) and cemented carbide end mills (JIS P10, linear thermal expansion coefficient $\alpha=6.5\times10^{-6}/°$ C.) corresponding thereto. Here, the tool-holding member had a tolerance of h7, the minimum interference was $\frac{1}{1000}$ of the outer diameter of the tool, and a working error in the inner diameter of the holding portion was 5 μm. The results are shown in Table 3.

TABLE 3

| No. | Outer Diameter of Tool[1] | Tool-Holding Member[2] | | Maximum Interference | Mises Stress (kgf/mm$^2$) | Shrinkage-Fitting Temp. (° C.) |
| | | Outer Diameter | Inner Diameter | | | |
|---|---|---|---|---|---|---|
| 1 | 3 | 9 | 3 | 18 | 158.5 | 500 |
| 2 | 4 | 10 | 4 | 21 | 135.3 | 440 |
| 3 | 6 | 12 | 6 | 23 | 95.5 | 327 |
| 4 | 8 | 14 | 8 | 28 | 83.5 | 300 |
| 5 | 10 | 16 | 10 | 30 | 69.6 | 260 |
| 6 | 12 | 18 | 12 | 35 | 66.2 | 253 |

Note:
[1]Unit: mm.
[2]Unit: mm (μm for interference).

As is clear from Table 3, the smaller the outer diameter of the tool, the larger the Mises stress. Therefore, tools usable in this example have outer diameters of 3 mm or more. On the other hand, because even SCM440 shows a sufficient after-heating yield strength for tools having outer diameters of 8 mm or more, this example is effective for tools having outer diameters of less than 8 mm.

APPLICATIONS IN INDUSTRY

As described above in detail, because the shrinkage-fit tool holder of the present invention comprises a tool-holding member or a tool-holding portion made of specialty steel having an austenitic structure, to which a cemented carbide tool is shrinkage-fit, it has the following advantages:

(1) Specialty steel having an austenitic structure has a large thermal expansion coefficient and retains sufficient yield strength even after heating to a shrinkage-fitting temperature. Therefore, the shrinkage-fitting temperature of a tool shank can be made lower, resulting in decrease in a time period required for attaching and detaching the tool while avoiding inaccurate fixing of the cemented carbide tool.

(2) Shrinkage fitting can be achieved at a low temperature, causing no change in a metal structure of shrinkage-fit portions and forming no oxide layer.

(3) Particularly with a tool holder body and a tool-holding member formed as separate, detachable members, only the tool-holding member needs to be heated for shrinkage fitting, thereby improving the efficiency of a shrinkage fitting operation.

(4) With properly elongated or shortened tool-holding member or tool-holding portion, deep working or working of complicated shapes having deep grooves can be flexibly carried out.

(5) With one or more apertures opening on rear end surfaces of guide grooves axially formed on the outer surface of the tool-holding member or the tool-holding portion for supplying a machining fluid or air, the machining fluid or air can effectively supplied to a tip end of a tool.

The shrinkage-fit tool holder of the present invention having the above features can perform high-precision working with little vibration even at high-speed rotation. The shrinkage-fit tool holder of the present invention is suitable for various machining tools such as machining centers, milling machines, etc.

What is claimed is:

1. A tool and tool holder assembly comprising (a) a tool holder body having a portion adapted to be connected to a machining center, a manipulator-engaging portion and a chuck portion; (b) a tool-holding member mounted to said tool holder body; and (c) a cemented carbide tool having a shank with a first thermal expansion coefficient, said tool-holding member firmly holding said shank of said cemented carbide tool by shrinkage fitting, at least said tool-holding member being made of specialty steel having an austenitic structure that is strengthened by precipitation hardening or work hardening, said tool-holding member having a second thermal expansion coefficient equal to or more than said first thermal expansion coefficient of said shank of said cemented carbide tool plus $9.1\times10^{-6}/°$ C.

2. The tool and tool holder assembly according to claim 1, wherein said tool-holding member is detachably fixed to said chuck portion of said tool holder body.

3. The tool and tool holder assembly according to claim 1, wherein said tool-holding member retains yield strength equal to or greater than a von Mises stress of the assembly, after repeated heating and cooling for shrinkage fitting.

4. The tool and tool holder assembly according to claim 1, wherein said tool-holding member has a thermal expansion coefficient of $13.5\times10^{-6}/°$ C. or more.

5. The tool and tool holder assembly according to claim 1, wherein said tool-holding member is provided with apertures for supplying a machining fluid or air, which open on surfaces of guide grooves longitudinally formed on an outer surface of said tool-holding member.

6. A tool and tool holder assembly comprising (1) a tool holder having a portion adapted to be connected to a machining center, a manipulator-engaging portion, a chuck portion and a tool-holding portion integrally formed in a front portion of said chuck portion and (2) a cemented carbide tool having a shank with a first thermal expansion coefficient, said chuck portion firmly holding said shank of said cemented carbide tool by shrinkage fitting, at least said tool-holding portion being made of specialty steel having an austenitic structure that is strengthened by precipitation hardening or work hardening, said tool-holding portion having a second thermal expansion coefficient equal to or more than said thermal expansion coefficient of said shank of said cemented carbide tool plus $9.1\times10^{-6}/°$ C.

7. The tool and tool holder assembly according to claim 6, wherein said tool-holding portion retains yield strength equal to or greater than a von Mises stress of the assembly, after repeated heating and cooling for shrinkage fitting.

8. The tool and tool holder assembly according to claim 6, wherein said tool-holding portion has a thermal expansion coefficient of $13.5\times10^{-6}/°$ C. or more.

9. The tool and tool holder assembly according to claim 6, wherein said tool-holding portion or a portion of said chuck portion in communication with said tool-holding portion is provided with apertures for supplying a machining fluid or air, which open on surfaces of guide grooves longitudinally formed on an outer surface of said tool-holding portion.

10. The tool and tool holder assembly according to claim 1, wherein said specialty steel has a composition comprising 0.4 to 1 weight % of C, 1.4 weight % or less of Si, 5 to 10 weight % of Mn, 2 to 10 weight % of Ni, 7 to 14 weight % of Cr, 0.5 to 2.5 weight % of V, 0.6 to 4 weight % of Cu, and 0.6 to 4 weight % of Al, the balance being substantially Fe and inevitable impurities.

11. The tool and tool holder assembly according to claim 1, wherein said specialty steel has a composition comprising 0.2 weight % or less of C, 1 weight % or less of Si, 14 to 16 weight % of Mn, 0.05 weight % or less of P, 0.02 weight % or less of S, 0.2 to 1.5 weight % of Ni, 15 to 19 weight % of Cr, and 0.3 to 0.4 weight % of N, the balance being substantially Fe and inevitable impurities.

12. The tool and tool holder assembly according to claim 1, wherein said specialty steel has a composition comprising 0.15 weight % or less of C, 3 to 4.5 weight % of Si, 2 weight % or less of Mn, 0.04 weight % or less of P, 0.03 weight % or less of S, 6 to 8 weight % of Ni, 14 to 16 weight % of Cr, 0.5 to 1.5 weight % of Mo, and 0.1 weight % or less of N, the balance being substantially Fe and inevitable impurities.

13. The tool and tool holder assembly according to claim 6, wherein said specialty steel has a composition comprising 0.4 to 1 weight % of C, 1.4 weight % or less of Si, 5 to 10 weight % of Mn, 2 to 10 weight % of Ni, 7 to 14 weight % of Cr, 0.5 to 2.5 weight % of V, 0.6 to 4 weight % Cu, and 0.6 to 4 weight % of Al, the balance being substantially Fe and inevitable impurities.

14. The tool and tool holder assembly according to claim 6, wherein said specialty steel has a composition comprising 0.2 weight % or less of C, 1 weight % or less of Si, 14 to 16 weight % of Mn, 0.05 weight % or less of P, 0.02 weight % or less of S, 0.2 to 1.5 weight % of Ni, 19 weight % of Cr, and 0.3 to 0.4 weight % of N, the balance being substantially Fe and inevitable impurities.

15. The tool and tool holder assembly according to claim 6, wherein said specialty steel has a composition comprising 0.15 weight % or less of C, 3 to 4.5 weight % of Si, 2 weight % or less of Mn, 0.04 weight % or less of P, 0.03 weight % or less of S, 6 to 8 weight % of Ni, 14 to 16 weight % of Cr, 0.5 to 1.5 weight % of Mo, and 0.1 weight % or less of N, the balance being substantially Fe and inevitable impurities.

16. The tool and tool holder assembly according to claim 1, wherein said cemented carbide tool shaft has an outer diameter of 3 mm or more and less than 8 mm.

17. The tool and tool holder assembly according to claim 6, wherein said cemented carbide tool shaft has an outer diameter of 3 mm or more and less then 8 mm.

* * * * *